(12) United States Patent
Yamaguchi

(10) Patent No.: US 8,334,938 B2
(45) Date of Patent: Dec. 18, 2012

(54) LAMINATED THIN FILM, PHASE PLATE, AND REFLECTIVE LIQUID CRYSTAL DISPLAY APPARATUS

(75) Inventor: Yutaka Yamaguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 513 days.

(21) Appl. No.: 12/696,455

(22) Filed: Jan. 29, 2010

(65) Prior Publication Data

US 2010/0188590 A1 Jul. 29, 2010

(30) Foreign Application Priority Data

Jan. 29, 2009 (JP) ................................. 2009-018003

(51) Int. Cl.
*G02F 1/1335* (2006.01)
(52) U.S. Cl. .......................................................... 349/9
(58) Field of Classification Search .................... None
See application file for complete search history.

(56) References Cited

U.S. PATENT DOCUMENTS

| 5,473,188 A | 12/1995 | Ando |
| 5,587,816 A * | 12/1996 | Gunjima et al. ................. 349/62 |
| 6,803,972 B1 * | 10/2004 | Budd et al. ......................... 349/9 |
| 2009/0086112 A1 * | 4/2009 | Kaida et al. ....................... 349/9 |

FOREIGN PATENT DOCUMENTS

| JP | 7-038050 A | 2/1995 |
| JP | 2004-102200 A | 4/2004 |
| JP | 2006-39135 A | 2/2006 |
| JP | 2006-133402 A | 5/2006 |

* cited by examiner

*Primary Examiner* — Lucy Chien
(74) *Attorney, Agent, or Firm* — Rossi, Kimms & McDowell LLP

(57) ABSTRACT

Provided is a phase plate having high phase compensation effect with low manufacturing cost, which is a device including a substrate and a thin film including laminated thin films of two or more types having different refractive indexes. The device performs phase compensation for an oblique incident polarized light ray, by using interference due to a high refractive index thin film and a low refractive index thin film.

13 Claims, 14 Drawing Sheets

WAVELENGTH $\lambda_0=650nm$

WAVELENGTH $\lambda_0=650nm$

BAND OF WAVELENGTH USED: 600nm-680nm

LAMINATED THIN FILM, PHASE PLATE, AND REFLECTIVE LIQUID CRYSTAL DISPLAY APPARATUS

BACKGROUND OF THE INVENTION

1. Field of the Invention

The present invention relates to a laminated thin film, a phase plate, and a display apparatus that projects an image displayed by a reflection type liquid crystal device.

2. Description of the Related Art

There is known a reflective liquid crystal display apparatus including a light source portion, an optical system for separating and combining an illumination light ray from the light source in accordance with its polarization, a reflection type liquid crystal display device for converting an emitted light ray into an image light ray, and a projection optical system for imaging the converted image light ray.

Hereinafter, a typical structure thereof is described. White color light emitted from a light source is aligned to have a predetermined polarization direction by a polarization conversion device and is separated into green, blue, and red color band light rays by a dichroic mirror. The blue and red color band light rays are further processed by a color selective phase plate to have a polarization direction of a predetermined wavelength band converted by 90 degrees, and illuminate liquid crystal display devices corresponding to predetermined colors via a polarization beam splitter. The liquid crystal display device converts the illumination light into image light in accordance with an image signal and reflects the image light. The image light rays are combined by the polarization beam splitter, a combining prism or the like, and the combined light is projected to a screen by the projection optical system.

An optical device that uses a liquid crystal device as a display device usually utilizes a polarization and anisotropy of refractive index. Therefore, an unnecessary phase characteristic is added to a polarized light ray entering the liquid crystal display device surface with an angle. For this reason, for example, it is known that even if the liquid crystal display device is in a black display state, light leakage occurs so that a part of light is projected to the screen. In the liquid crystal image display apparatus (hereinafter referred to also as liquid crystal projector), such light significantly decreases contrast of a display image.

It is supposed that an optical axis of a liquid crystal molecule is directed to the normal direction of the liquid crystal display device surface in the black display state of the liquid crystal display device. Actually, the optical axis of the liquid crystal display device is not perpendicular to the device surface but has an angle (pretilt angle). However, the pretilt angle of the liquid crystal molecule is so small that the influence thereof can be neglected. The liquid crystal display device does not show birefringent property with respect to a polarized light ray entering the device at a right angle, and hence the reflected polarized light is not modulated in phase. Therefore, the light returns to the polarization beam splitter in the same state as the state of when the light has entered the device, and hence no leakage light occurs. However, the liquid crystal display device exhibits the birefringent property to a polarized light ray entering at a certain angle (incident angle) with respect to the normal of the surface in accordance with the incident angle. Therefore, the polarized light ray is modulated in phase. The polarized light after the phase modulation cannot be separated sufficiently by the polarization beam splitter so that the leakage light occurs.

It is known that the leakage light resulting from the above-mentioned cause may be suppressed by disposing a phase plate having refractive index anisotropy that is opposite to the refractive index anisotropy of the liquid crystal molecules at a vicinity of the liquid crystal display device. For instance, it is supposed that liquid crystal molecules in the liquid crystal display device have positive anisotropy. If the positive anisotropy is expressed by a refractive index ellipsoid, the positive anisotropy can be expressed as an ellipsoid having a large refractive index in the z axis direction ($n_z > n_x = n_y$) as illustrated in FIG. 2. The z axis direction in FIG. 2 represents the optical axis direction. With respect to the medium having this anisotropy, a negative anisotropy phase plate, which has small refractive index anisotropy in the optical axis direction ($n_z < n_x = n_y$), is disposed at a vicinity of the liquid crystal display device. The phase plate having negative refractive index anisotropy can effectively cancel a phase variation that occurs in the liquid crystal molecules, and as a result, the leakage light can be reduced.

There is widely known as this phase plate the one made of monocrystalline sapphire, anisotropy crystal such as quartz, or organic films extended and laminated. In addition, Japanese Patent Application Laid-Open No. 2004-102200 proposes a method of disposing a structural birefringence body, in which a high refractive index thin film and a low refractive index thin film are laminated, between the liquid crystal display device and a polarizer and/or between the liquid crystal display device and an analyzer in the liquid crystal projector. In addition, Japanese Patent Application Laid-Open No. 2006-39135 proposes a compensation method using a combination device of a phase plate formed of a structural birefringence body in which thin films having different refractive indexes are laminated and a wavelength plate formed of a one-dimensional periodical structure having a period of light wavelength or smaller in the in-plane direction. This method proposes to use a single device for correcting the leakage light that occurs in the light ray entering the liquid crystal display device at a right angle and the leakage light due to the oblique incident light ray.

Both Japanese Patent Application Laid-Open No. 2004-102200 and Japanese Patent Application Laid-Open No. 2006-39135 use the structural birefringence as the phase plate. In a fine structure of a light wavelength or smaller, the refractive index of the entire structure can be handled as an effective refractive index. For instance, in the case of the structure in which thin films of a refractive index $n_A$ and a film thickness $L_A$, and thin films of a refractive index $n_B$ and a film thickness $L_B$ are repeated, it is known that the effective refractive index $n_{TE}$ with respect to the light polarized in the in-plane direction of the entire laminated thin film and the effective refractive index $n_{TM}$ with respect to the light polarized in the surface normal direction are expressed by the following equations.

$$\text{in-plane direction: } n_{TE} = \sqrt{\frac{L_A n_A^2 + L_B n_B^2}{L_A + L_B}}$$

$$\text{surface normal direction: } n_{TM} = \sqrt{\frac{L_A + L_B}{L_A/n_A^2 + L_B n_B^2}}$$

In this case, "$n_{TE} > n_{TM}$" holds regardless of parameters of the refractive index and the film thickness, and the structural birefringence body acts as a negative phase plate having a small refractive index with respect to the light polarized in the surface normal direction.

The phase plate using the structural birefringence body has advantages that the phase characteristics can be controlled by the structure and that a phase plate with little deterioration with respect to heat and ultraviolet rays can be obtained by using inorganic material.

There is another leakage light due to the polarization beam splitter in addition to the leakage light due to the liquid crystal display device in the reflection type liquid crystal image display apparatus having the polarization beam splitter. As a method of compensating for the leakage light, Japanese Patent Publication No. 7-38050 proposes a method of disposing a ¼ wavelength plate between the polarization beam splitter and the liquid crystal display device.

The phase characteristics of the phase plate are determined by the product $\Delta n \cdot d$ of the refractive index anisotropy $\Delta n$ and a total film thickness d. Approximately 1 to several microns of the total film thickness d is necessary in many cases even for the structural birefringence body that can obtain large anisotropy, and it is necessary to laminate multiple layers corresponding to the film thickness in number in order to obtain the desired phase characteristic. However, thin films are laminated for the phase plate formed of the structural birefringence body thin film in order to avoid an interaction region. For instance, Japanese Patent Application Laid-Open No. 2004-102200 describes an example of the structural birefringence body in which thin films of $TiO_2$ and $SiO_2$ are laminated to have a film thickness of 15 nm. In order to obtain a negative phase plate of retardance $\Delta n \cdot d = 250$ nm of the structural birefringence body thin film, it is necessary to laminate approximately 90 layers of thin films based on the theory of effective refractive index. Thus, the phase plate formed of the laminated birefringence body thin films has a disadvantage that a film thickness of each layer is so small that a large number of layers are necessary, resulting in a problem of manufacturing cost.

In addition, the methods of Japanese Patent Application Laid-Open No. 2004-102200 and Japanese Patent Application Laid-Open No. 2006-39135 can compensate for the leakage light due to the liquid crystal display device, but cannot compensate for a leakage light component due to the polarization beam splitter. Similarly, the method of Japanese Patent Publication No. 7-38050 cannot compensate for leakage light due to the liquid crystal display device.

SUMMARY OF THE INVENTION

In order to improve contrast of the liquid crystal projector, it is necessary to totally compensate for all leakage light components that occur due to various causes. However, in the conventional phase plate, compensation for individual leakage light is performed, but total phase compensation is not performed. Further, it is considered to combine the both compensation methods so that the total phase compensation can be performed. However, manufacturing cost of the phase plate formed of the structural birefringence body is high. Further, the additional wavelength plate (¼ wavelength plate) causes an increase in number of components, which is undesirable in terms of cost.

It is an object of the present invention to realize an optical device having high phase compensation effect with low manufacturing cost.

A laminated thin film according to the invention of the subject application includes: a substrate; and at least two types of materials laminated on the substrate, in which: the laminated thin film has a transmittance of 95% or higher in a working wavelength band with respect to both P-polarized light and S-polarized light; and the following expression (1) is satisfied with respect to a light ray of a specific wavelength $\lambda_0$ contained in the working wavelength band, and the following expressions (2) and (3) are always satisfied in a range of $0 < \theta \leq 15$ degrees, $$0.25 < (n_H \cdot d_H + n_L \cdot d_L)/\lambda_0 < 0.5 \qquad (1)$$

$$0.95 \leq \frac{\Delta(\theta)}{A\sin^2\theta} \leq 1.05 \qquad (2)$$

$$\text{where, } A = \frac{\Delta(10°)}{\sin^2(10°)}, |\Delta(10°)| \geq 2.0(\text{degrees}) \qquad (3)$$

where an average film thickness of a material having relatively high refractive index $n_H$ is represented by $d_H$, an average film thickness of a material having relatively low refractive index $n_L$ is represented by $d_L$ of the materials forming the laminated thin film, and a phase difference received by a light ray entering at an angle $\theta$ with respect to a normal of a surface of the laminated thin film is represented by $\Delta(\theta)$.

A phase plate according to the invention of the subject application includes: a substrate; a one-dimensional periodical structure with a period that is a minimum wavelength or smaller in a working wavelength band in an in-plane direction of the substrate; and a laminated thin film including at least two or more types of materials laminated on one another, the following expression (1) is satisfied with respect to a light ray of a specific wavelength $\lambda_0$ contained in the working wavelength band, and the following expressions (5) and (6) are always satisfied in a range of $0 < \theta \leq 15$ degrees;

$$0.25 < (n_H \cdot d_H + n_L \cdot d_L)/\lambda_0 < 0.5 \qquad (1)$$

$$0.95 \leq \frac{B - \Delta(\theta)}{A\sin^2\theta} \leq 1.05 \text{ where} \qquad (5)$$

$$A = \frac{B - \Delta(10°)}{\sin^2(10°)}, |B - \Delta(10°)| \geq 2.0(\text{degrees}), B = \Delta(0°) \qquad (6)$$

where an average film thickness of a material having relatively high refractive index $n_H$ is represented by $d_H$, an average film thickness of a material having relatively low refractive index $n_L$, is represented by $d_L$, of the materials forming the laminated thin film, and a phase difference received by a light ray entering at an angle $\theta$ with respect to a normal of a surface of the laminated thin film is represented by $\Delta(\theta)$.

According to the present invention, the phase plate having a small number of laminated thin films and a small total film thickness can be realized with low manufacturing cost. In addition, if the phase plate formed of the laminated thin film is combined with a ¼ wavelength plate for total phase compensation, a liquid crystal projector having high contrast can be provided.

Further features of the present invention will become apparent from the following description of exemplary embodiments with reference to the attached drawings.

DESCRIPTION OF THE EMBODIMENTS

Hereinafter, embodiments of the present invention are described.

Structures of a laminated thin film, a phase plate, and a liquid crystal projector including the same according to the present invention are described below.

[Embodiment 1]

Figure 1:
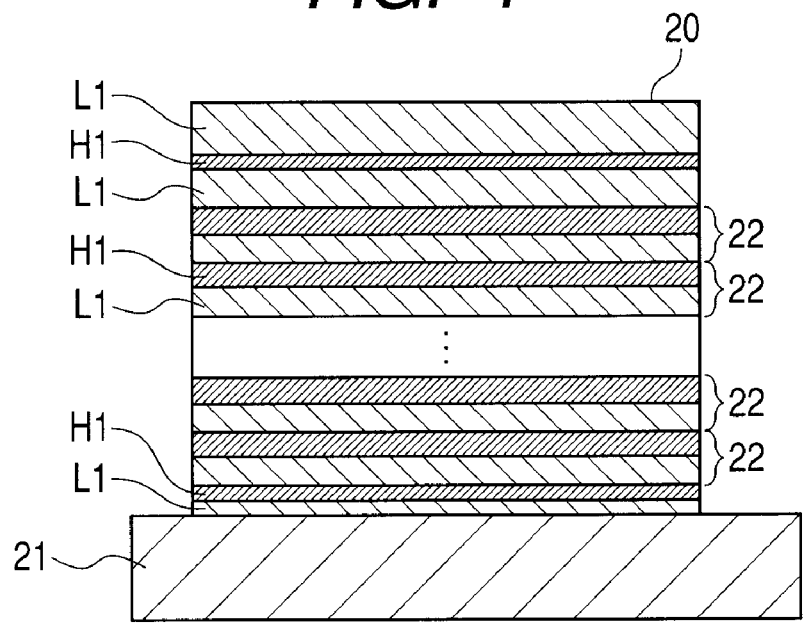
FIG. 1 is a schematic structural diagram illustrating a form of Embodiment 1.
Figure 2:
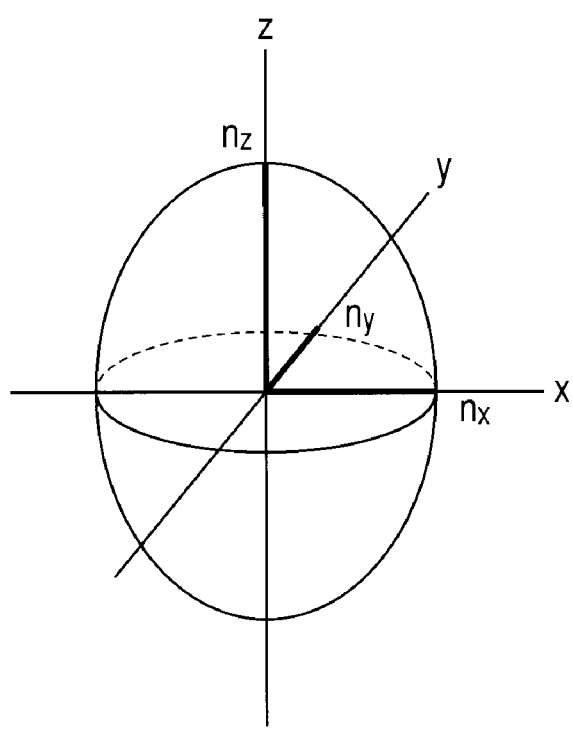
FIG. 2 is a schematic diagram illustrating a refractive index ellipsoid of a liquid crystal molecule.

FIG. 1 is a schematic diagram illustrating a structure of Embodiment 1 of the laminated thin film used in a wavelength range of 500 to 580 nm. In addition, Table 1 shows design values of Embodiment 1. In Table 1, the hatched portion corresponds to a repetition layer 22.

A laminated thin film 20 has a structure illustrated in FIG. 1, in which $TiO_2$ thin films H1 having high refractive index (refractive index $n_H$=2.32) and $SiO_2$ thin films L1 having low refractive index (refractive index $n_L$=1.46) are laminated alternately in 27 layers on a substrate 21 (BK7 having a refractive index of 1.52). In this case, average film thicknesses of the individual layers are as follows. The average film thickness of the $TiO_2$ films is $d_H$=(48×11+38+25)/13=45.5 nm. The average film thickness of the $SiO_2$ films is $d_L$=(48×11+122+48+22)/14=51.4 nm. Supposing a reference wavelength $\lambda_0$=550 nm in a working wavelength band, the above-mentioned calculation results satisfy the expression (1).

$$0.25<(n_H \cdot d_H+n_L \cdot d_L)/\lambda_0<0.5 \qquad (1)$$

The conventional laminated thin film uses structural birefringence, and the film thickness is required to be as thin as possible in order to handle the laminated thin film as a structural birefringence body. In contrast, the laminated thin film of the present invention utilizes an interaction region by intentionally increasing each film thickness to be larger than a structural birefringence region, to thereby obtain the phase characteristics. Thus, not only the number of laminated thin films but also the total film thickness can be reduced. This effect can be obtained by satisfying the conditional expression (1).

Figure 3:
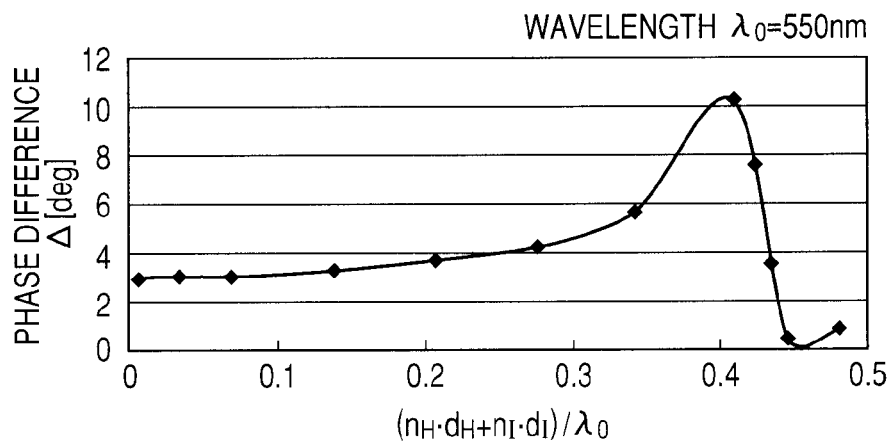
FIG. 3 is a graph illustrating a correlation between a single layer film thickness and phase characteristics in a laminated thin film.

FIG. 3 illustrates how the phase characteristics of linearly polarized light entering at an incident angle of 10 degrees vary in accordance with the film thickness of the single layer in the structure in which $TiO_2$ films and $SiO_2$ films are laminated repeatedly with a uniform film thickness to be a given total film thickness. The horizontal axis represents the value obtained by dividing by $\lambda_0$ the sum of the optical film thicknesses each determined by the average film thickness and the refractive index (($n_H \cdot d_H+n_L \cdot d_L$)/$\lambda_0$), and the vertical axis represents a phase difference. In addition, FIG. 4 is a graph showing transmittance, and shows spectral transmittances of laminated thin films having values of ($n_H \cdot d_H+n_L \cdot d_L$)/$\lambda_0$=0.38, 0.41, and 0.48, respectively, in the case where the $TiO_2$ films and the $SiO_2$ films are laminated repeatedly with a uniform film thickness to be a given total film thickness, similarly to FIG. 3.

In FIG. 3, the range satisfying the conditional expression (1) corresponds to the range from 0.25 to 0.5 on the horizontal axis. It is understood that the phase difference increases by a ratio larger than the ratio in which the film thickness increases particularly in the range from 0.25 to 0.42 on the horizontal axis of FIG. 3. If this range is used, a desired phase difference can be obtained by a small total film thickness. Further, the number of laminated layers can be reduced largely because the total film thickness decreases in addition to an increase of the film thickness of the single layer. In addition, in the range from 0.42 to 0.5 on the horizontal axis, there is an advantage that the phase difference that is equivalent to that in the region below the lower limit in the conditional expression (1) can be obtained by smaller number of laminated layers, though a large phase difference cannot be obtained with respect to the total film thickness. Therefore, it is preferable that the laminated thin film of the present invention should satisfy "0.25<($n_H \cdot d_H+n_L \cdot d_L$)/$\lambda_0$<0.5", and it is more preferable to satisfy "0.25<($n_H \cdot d_H+n_L \cdot d_L$)/$\lambda_0$<0.42".

The range below 0.25 on the horizontal axis, which is the range below the lower limit in the conditional expression (1), is the structural birefringence region in which the film thickness of each layer is so thin that the phase difference depends little on the film thickness of each layer. In this region, the effect of reducing the total film thickness cannot be expected, and the number of laminated layers increases for obtaining the phase difference.

Figure 4:
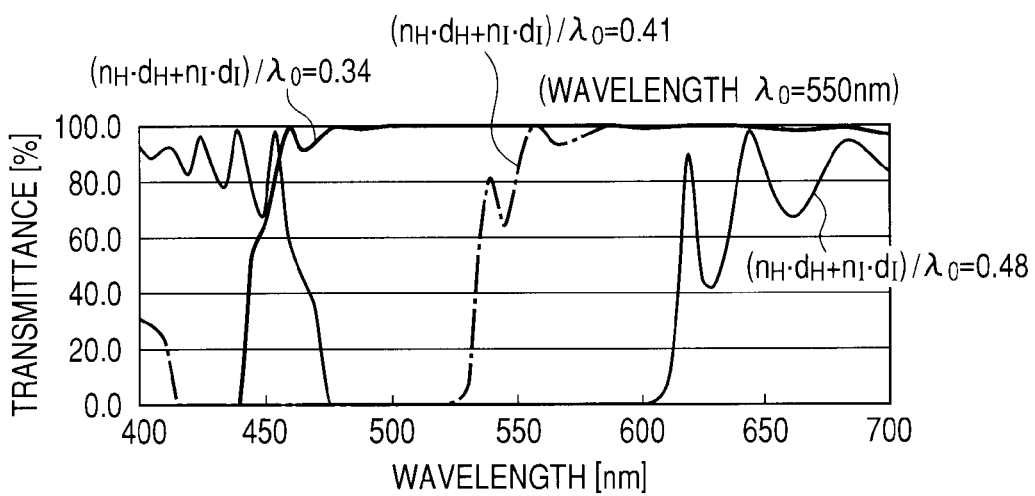
FIG. 4 is a graph illustrating a correlation between a single layer film thickness and transmittance in the laminated thin film.

In addition, as understood from FIG. 4, if the film thickness of each layer is increased so that the value of ($n_H \cdot d_H+n_L \cdot d_L$) is increased, the low transmittance region is shifted to the long wavelength side.

In addition, at a vicinity of the value $(n_H \cdot d_H + n_L \cdot d_L)/\lambda_0 = 0.5$, the transmittance cannot be obtained with respect to the wavelength $\lambda_0$. Therefore, it is preferable to select the film thickness so as to satisfy the conditional expression (1) for obtaining the phase characteristics effectively and high transmittance.

Figure 5A:
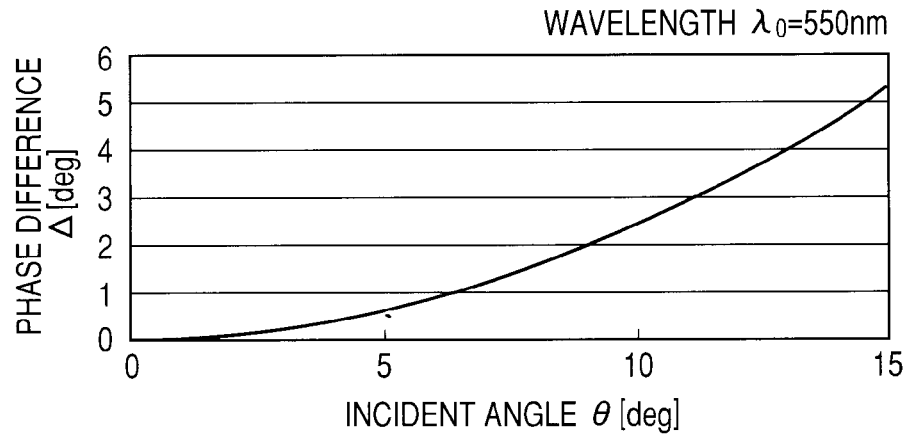
FIGS. 5A, 5B and 5C are graphs illustrating optical characteristics of the laminated thin film according to Embodiment 1.
Figure 5B:
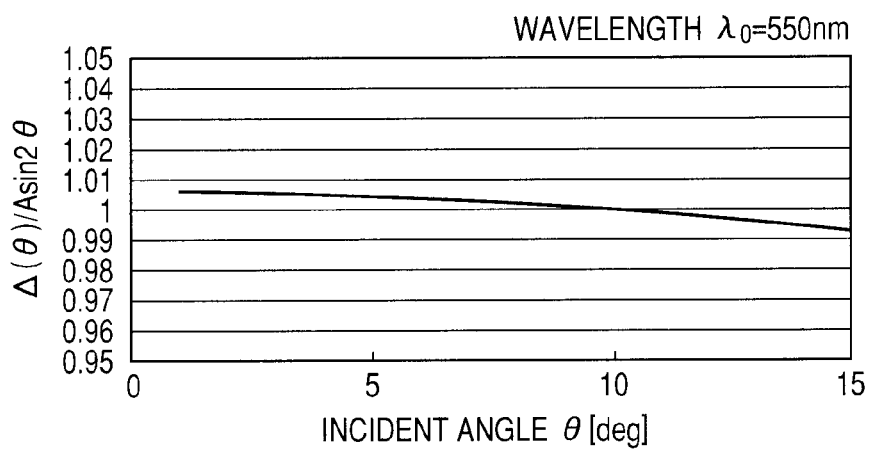
Figure 5C:
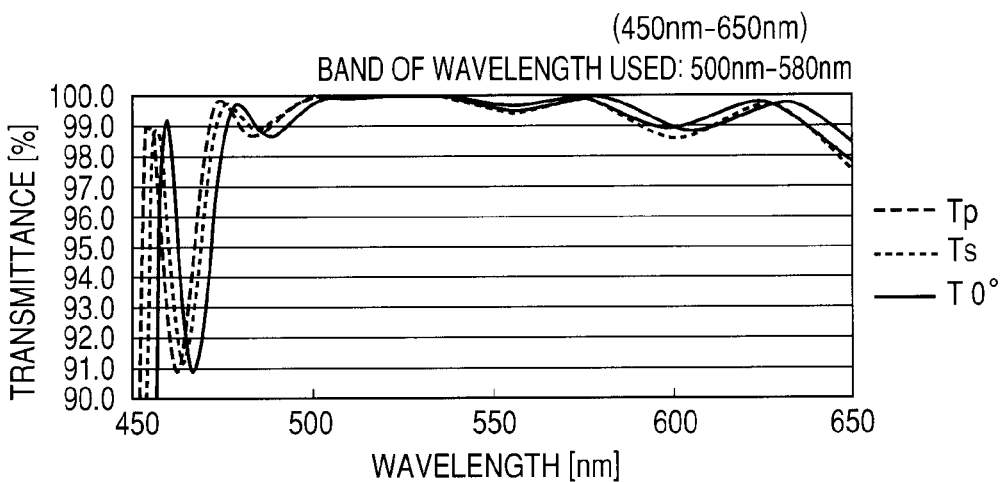

FIGS. 5A to 5C illustrate optical characteristics of the laminated thin film of Embodiment 1. FIG. 5A is a graph in which the phase difference $\Delta(\theta)$ received by the light ray entering the laminated thin film of Embodiment 1 at an angle $\theta$ is plotted on the plane of the vertical axis $\Delta$ and the horizontal axis $\theta$. FIG. 5B illustrates a result of plotting the characteristics on the plane of the horizontal axis $\theta$ and the vertical axis $\Delta(\theta)/A \sin^2\theta$. In addition, FIG. 5C illustrates the spectral transmittances T0°, Tp, and Ts of P- and S-polarized light rays of when the incident angle $\theta$ in Embodiment 1 is 0 and 15 degrees.

In the conditional expression (2), $\Delta(\theta)/A \sin^2\theta$ is a value indicating a deviation from the $\sin^2\theta$ curve with respect to the incident angle. Here, the coefficient $A = \Delta(10°)/\sin^2\theta$, which indicates the coefficient at $\theta = 10$ degrees when $\Delta(\theta)$ is fitted by $\sin^2\theta$. In the range of $0 < \theta \leq 15$ degrees, a variation of the phase characteristics follows $\sin^2\theta$ approximately. In order that the phase compensation should be performed smoothly with respect to the incident angle, it is preferable that a value of $\Delta/A \sin^2\theta$ should be close to 1, and actually it is preferable that the value should be within the range of the conditional expression (2). If the value is outside the range of the conditional expression (2), the phase characteristics are deviated from the $\sin^2\theta$ curve, which is not desirable because a disadvantageous influence to the phase compensation is given.

In addition, it is desirable that the phase difference $|\Delta(10°)|$ of when the incident angle is 10 degrees is 2 degrees or larger in order to obtain the phase compensation effect as a phase plate. If the phase difference $|\Delta(10°)|$ is small, the obtained phase compensation effect becomes also small, and hence it is difficult to obtain sufficient effect as a phase plate.

$$0.95 \leq \frac{\Delta(\theta)}{A \sin^2\theta} \leq 1.05 \quad (2)$$

$$\text{where, } A = \frac{\Delta(10°)}{\sin^2(10°)}, |\Delta(10°)| \geq 2.0 \text{(degrees)} \quad (3)$$

It is desirable that the laminated thin film of the present invention should have 95% or higher transmittance in the entire region of the working wavelength band with respect to both the P-polarized light and the S-polarized light, and it is more desirable to have 98% or higher transmittance. If the transmittance is low, or if a difference of transmittance between the P-polarized light and the S-polarized light is large, the transmitted light amount is decreased. In addition, a ripple occurs in the incident angle characteristics or the spectral characteristics of the phase difference, to thereby affect phase characteristics. As a result, the incident angle characteristic of the phase difference is deviated from the $\sin^2\theta$ curve, and the phase compensation effect is reduced.

An upper limit and a lower limit on the vertical axis in FIG. 5B correspond to an upper limit and a lower limit in the conditional expression (2). Embodiment 1 satisfies the conditional expression (2) in the entire range of $0 < \theta \leq 15$ degrees. As understood from FIG. 5A, the phase difference of when the incident angle $\theta$ is 10 degrees becomes $|\Delta(10°)| = 2.4$ degrees, which satisfies the conditional expression (3). In addition, as understood from FIG. 5C, the laminated thin film of Embodiment 1 can obtain a high transmittance of 95% or higher in the working wavelength range (500 to 580 nm).

When the film thickness is selected in the design, the average film thickness should be controlled to satisfy the conditional expression (1), to thereby obtain high transmittance without sacrifice of the phase characteristics. Further, it is also effective to provide a reflection preventing layer at least one of the interface between the laminated thin films and the substrate, and the interface that is farthest from the substrate in the laminated thin films. In addition, as described in this embodiment, reflection at the outermost surface of the laminated thin films can be suppressed by appropriately adjusting the film thicknesses of a few layers that are closest to the substrate and a few layers that are farthest from the substrate among the laminated thin films. With this structure, higher transmittance and smoother phase characteristics can be obtained without increasing new material as the reflection preventing layer.

Figure 6:
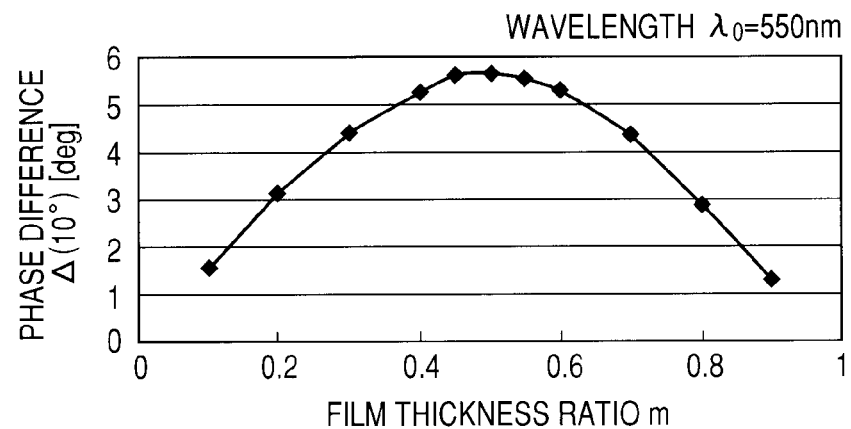
FIG. 6 is a graph illustrating a correlation between a film thickness ratio and phase characteristics in the laminated thin film.

The film thickness ratio m expressed by the expression (4) indicates a ratio of average film thicknesses between the high refractive index film and the low refractive index film. FIG. 6 illustrates how the phase characteristics of the laminated thin film vary in accordance with the film thickness ratio m in the case where the total film thickness and the number of laminated layers are constant. As understood from FIG. 6, a maximum value appears at the film thickness ratio of 0.5 or the vicinity thereof, and a large phase difference can be obtained by selecting this region or the vicinity thereof. However, it is necessary to avoid high reflectivity in the desired wavelength band like a dichroic film. It is desirable to satisfy the conditional expression (4) in order to obtain the phase characteristics efficiently with a small total film thickness while maintaining high transmittance. The film thickness ratio m of the laminated thin film of Embodiment 1 is 0.47, which satisfies the conditional expression (4).

$$m = d_H/(d_H + d_L) \quad (4)$$

It is preferable to use an inorganic material having a large refractive index difference as a material forming the thin film. In Embodiment 1, $TiO_2$ is used as the high refractive index material, and $SiO_2$ is used as the low refractive index material. Alternatively, $CeO_2$, $ZrO_2$, $Ta_2O_5$, $SnO_2$, $In_2O_3$, $Al_2O_3$, or the like can be used as the high refractive index material. $Al_2O_3$, $MgF_2$, $CaF_2$, or the like can be used as the low refractive index material in accordance with the refractive index of the high refractive index material.

[Embodiment 2]

A laminated thin film of Embodiment 2 is used in the wavelength range of 400 to 480 nm. General structure thereof is the same as that of Embodiment 1, and is described with reference to FIG. 1 similarly to Embodiment 1. In addition, Table 2 shows design values of Embodiment 2. The hatched portion in Table 2 indicates the repetition layer 22.

The laminated thin film of Embodiment 2 has a structure illustrated in FIG. 1, in which $TiO_2$ thin films H2 having high refractive index (refractive index of 2.43) and $SiO_2$ thin films L2 having low refractive index (refractive index of 1.47) are laminated alternately in 35 layers on a substrate 21 (BK7 having a refractive index of 1.52). The average film thicknesses of the individual layers are as follows. The average film thickness of the $TiO_2$ films is $d_H = (36 \times 15 + 32 \times 19)/17 = 34.8$ nm. The average film thickness of the $SiO_2$ films is $d_L = (36 \times 15 + 89 \times 29 + 17)/18 = 37.5$ nm. Supposing a reference wavelength $\lambda_0 = 450$ nm in the working wavelength band, the conditional expression (1) is satisfied. In addition, the film thickness ratio m becomes 0.48, which satisfies the conditional expression (4).

Figure 7A:
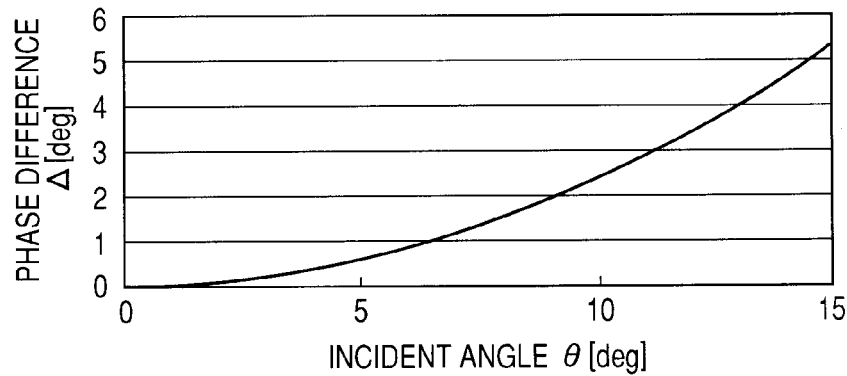
FIGS. 7A, 7B and 7C are graphs illustrating optical characteristics of a laminated thin film according to Embodiment 2.
Figure 7B:
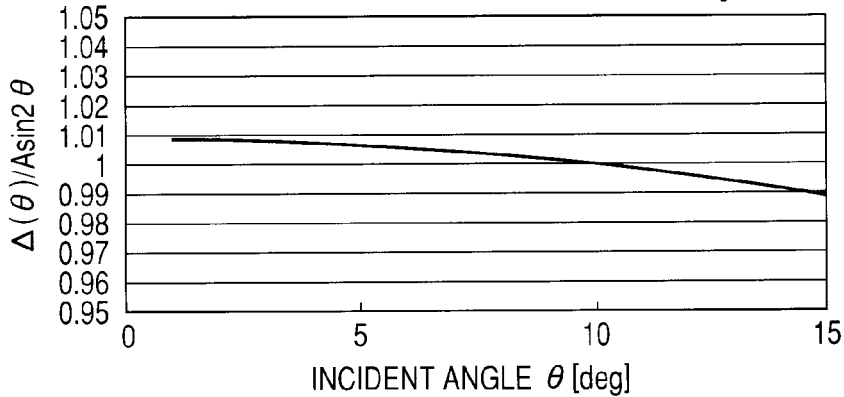
Figure 7C:
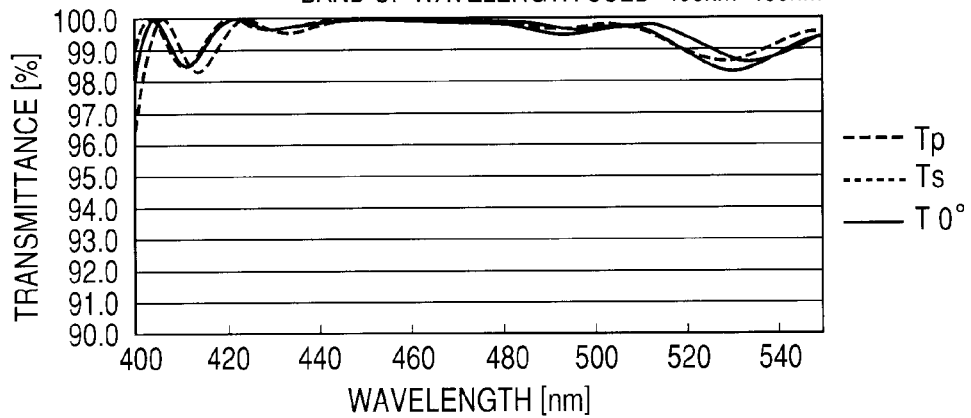

FIGS. 7A to 7C are graphs illustrating optical characteristics of the laminated thin film of Embodiment 2. FIG. 7A is a graph in which the phase difference $\Delta(\theta)$ received by the light ray entering the laminated thin film of Embodiment 2 at an angle $\theta$ is plotted on the plane of the vertical axis $\Delta$ and the horizontal axis $\theta$. FIG. 7B illustrates a result of plotting the characteristics on the plane of the horizontal axis $\theta$ and the vertical axis $\Delta(\theta)/A \sin^2\theta$. In addition, FIG. 7C shows the spectral transmittances T0°, Tp, and Ts of P- and S-polarized light rays of when the incident angle $\theta$ in Embodiment 2 is 0 and 15 degrees.

As understood from FIG. 7A, the phase difference of when the incident angle $\theta$ is 10 degrees becomes $|\Delta(10°)|=3.0$ degrees, which satisfies the conditional expression (3). As understood from FIG. 7B, the laminated thin film of Embodiment 2 satisfies the conditional expression (2). In addition, as understood from the spectral transmittance of FIG. 7C, the laminated thin film of Embodiment 2 can obtain a high transmittance of 95% or higher in the working wavelength band (400 to 480 nm).

[Embodiment 3]

A laminated thin film of Embodiment 3 is used in the wavelength range of 600 to 680 nm. General structure thereof is the same as that of Embodiment 1, and is described with reference to FIG. 1 similarly to Embodiment 1. In addition, Table 3 shows design values of Embodiment 3. The hatched portion in Table 3 indicates the repetition layer 22.

The laminated thin film of Embodiment 3 has a structure illustrated in FIG. 1, in which $TiO_2$ thin films H2 having high refractive index (refractive index of 2.28) and $SiO_2$ thin films L2 having low refractive index (refractive index of 1.46) are laminated alternately in 23 layers on a substrate 21 (BK7 having a refractive index of 1.52). The average film thicknesses of the individual layers are as follows. The average film thickness of the $TiO_2$ films is $d_H=(60\times9+68+32)/11=58.2$ nm. The average film thickness of the $SiO_2$ films is $d_L=(60\times9+129+40+76)/12=65.4$ nm. Supposing a reference wavelength $\lambda_0=650$ nm in the working wavelength band, the conditional expression (1) is satisfied. In addition, the film thickness ratio m becomes 0.47, which satisfies the conditional expression (4).

Figure 8A:
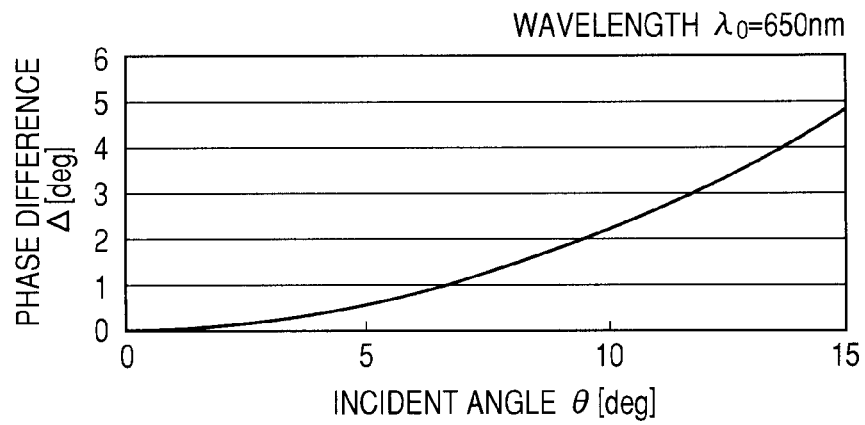
FIGS. 8A, 8B and 8C are graphs illustrating optical characteristics of a laminated thin film according to Embodiment 3.
Figure 8B:
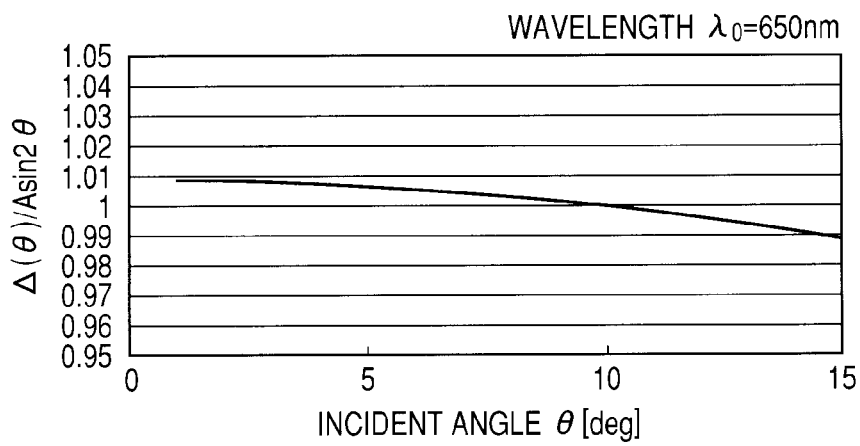
Figure 8C:
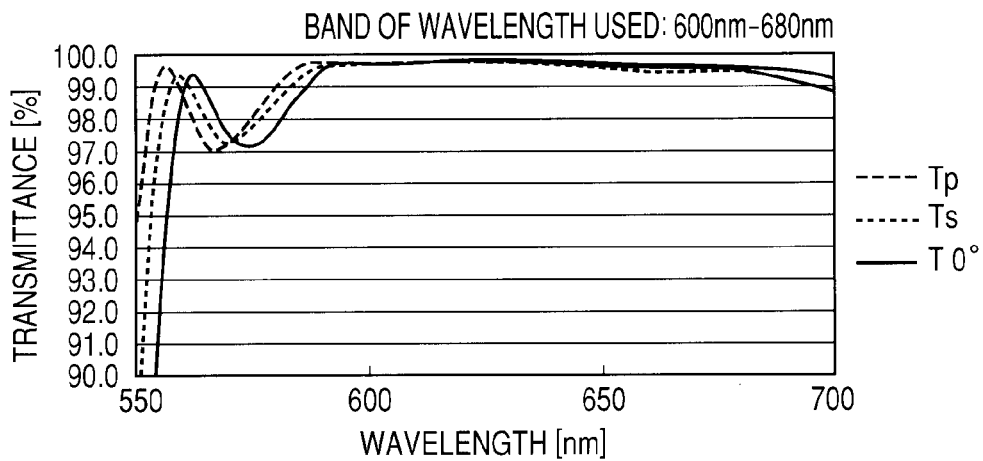

FIG. 8A is a graph in which the phase difference $\Delta(\theta)$ received by the light ray entering the laminated thin film of Embodiment 3 at an angle $\theta$ is plotted on the plane of the vertical axis $\Delta$ and the horizontal axis $\theta$. FIG. 8B illustrates a result of plotting the characteristics on the plane of the horizontal axis $\theta$ and the vertical axis $\Delta(\theta)/A \sin^2\theta$. In addition, FIG. 8C shows the spectral transmittances T0°, Tp, and Ts of P- and S-polarized light rays of when the incident angle $\theta$ in Embodiment 3 is 0 and 15 degrees.

As understood from FIG. 8A, the phase difference of when the incident angle $\theta$ is 10 degrees becomes) $|\Delta(10°)|=2.2$ degrees, which satisfies the conditional expression (3). As understood from FIG. 8B, the laminated thin film of Embodiment 3 satisfies the conditional expression (2). In addition, as understood from the spectral transmittance of FIG. 8C, the laminated thin film of Embodiment 3 can obtain a high transmittance of 95% or higher in the working wavelength band (600 to 680 nm).

[Embodiment 4]

Figure 9:
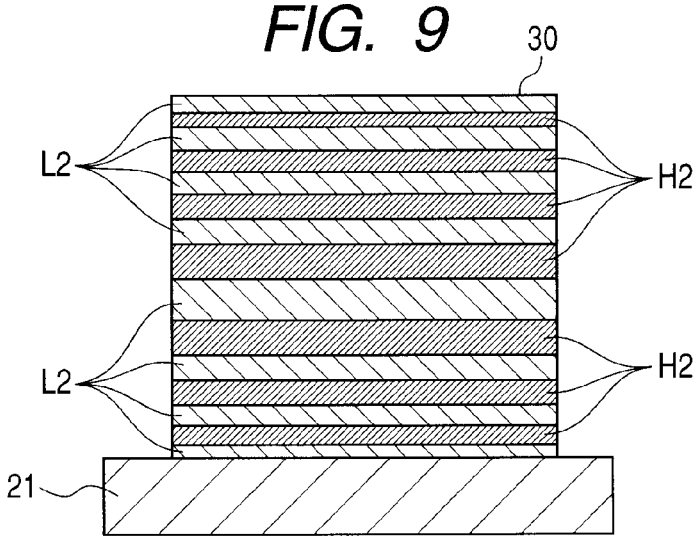
FIG. 9 is a schematic structural diagram illustrating a form of Embodiment 4.

FIG. 9 is a schematic diagram of a structure of a laminated thin film according to Embodiment 4 that is used in a wavelength range of 500 to 580 nm. In addition, Table 4 shows design values of Embodiment 4.

A laminated thin film 30 has a structure illustrated in FIG. 9, in which $TiO_2$ thin films H2 having high refractive index (refractive index of 2.32) and $SiO_2$ thin films L2 having low refractive index (refractive index of 1.46) are laminated alternately in 23 layers on a substrate 21 while the respective film thicknesses vary. The laminated thin film of the present invention is not required to be repetition of layers having a uniform single layer film thickness, and the structure in which the film thickness of each layer varies like Embodiment 2 can also have the phase characteristics effectively. The average film thicknesses of the individual layers are as follows. The average film thickness of the $TiO_2$ films is $d_H=46.7$ nm. The average film thickness of the $SiO_2$ films is $d_L=55.7$ nm. Supposing a reference wavelength $\lambda_0=550$ nm in the working wavelength band, the conditional expression (1) is satisfied. In addition, the film thickness ratio m becomes 0.46, which satisfies the conditional expression (4).

Figure 10A:
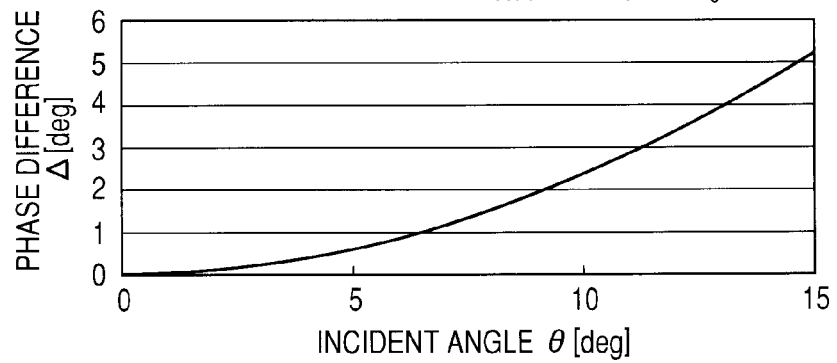
FIGS. 10A, 10B and 10C are graphs illustrating optical characteristics of a laminated thin film according to Embodiment 4.
Figure 10B:
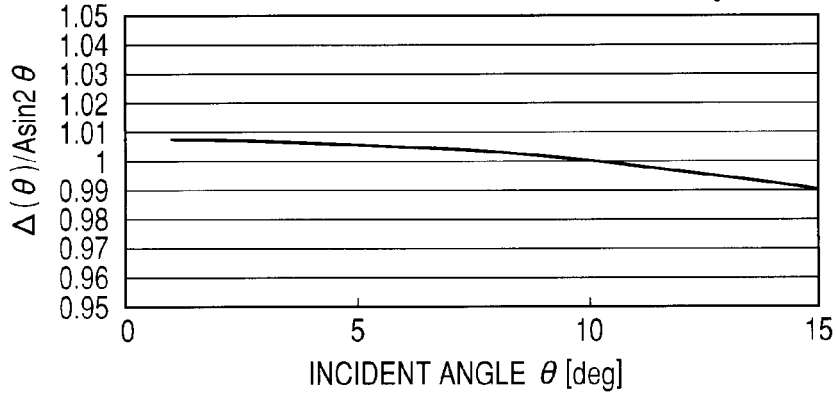
Figure 10C:
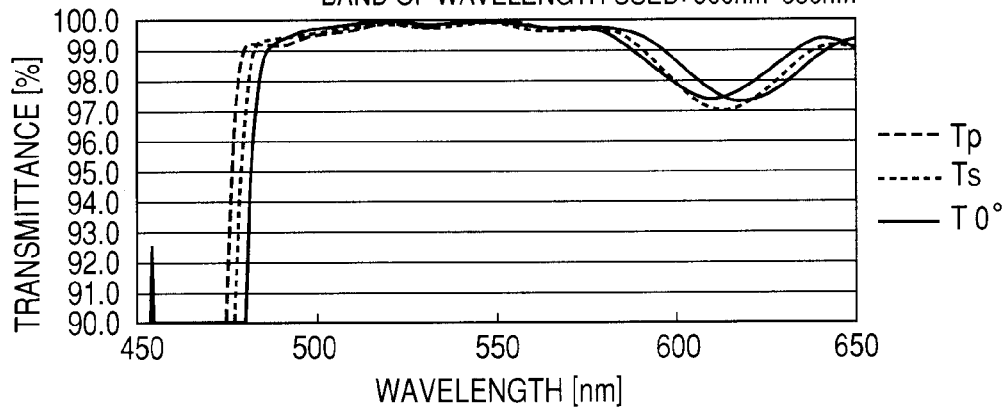

FIG. 10A is a graph in which the phase difference $\Delta(\theta)$ received by the light ray entering the laminated thin film of Embodiment 4 at an angle $\theta$ is plotted on the plane of the vertical axis A and the horizontal axis $\theta$. FIG. 10B illustrates a result of plotting the characteristics on the plane of the horizontal axis $\theta$ and the vertical axis $\Delta(\theta)/A \sin^2\theta$. In addition, FIG. 10C shows the spectral transmittances T0°, Tp, and Ts of P- and S-polarized light rays of when the incident angle $\theta$ in Embodiment 4 is 0 and 15 degrees.

As understood from FIG. 10A, the phase difference of when the incident angle $\theta$ is 10 degrees becomes $|\Delta(10°)|=2.4$ degrees, which satisfies the conditional expression (3). As understood from FIG. 10B, the laminated thin film of Embodiment 4 satisfies the conditional expression (2). In addition, as understood from the spectral transmittance of FIG. 10C, 95% or higher transmittance is exhibited in the working wavelength band (500 to 580 nm). The laminated thin film of Embodiment 4 has the structure in which the film thicknesses of the laminated thin films are gradually varied so as not to serve as a reflection film and so that a thick film can be laminated. Thus, the phase characteristics substantially equivalent to those of Embodiment 1 can be obtained by the small number of laminated layers, i.e., 23 layers.

[Embodiment 5]

Figure 11:
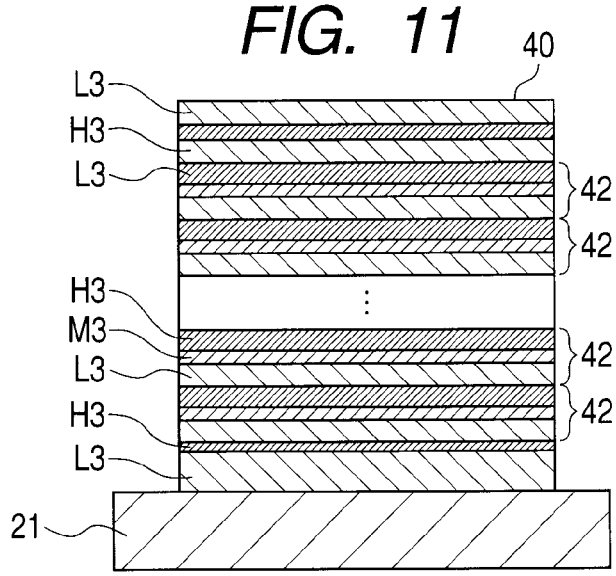
FIG. 11 is a schematic structural diagram illustrating a form of Embodiment 5.

FIG. 11 is a schematic diagram illustrating a structure of a laminated thin film of Embodiment 5 used in the wavelength range of 500 to 580 nm. Table 5 shows design values of Embodiment 5. In Table 5, the hatched portion corresponds to a repetition layer 42 illustrated in FIG. 11.

A laminated thin film 40 of Embodiment 5 has a structure illustrated in FIG. 11, in which $TiO_2$ thin films H3 having high refractive index (refractive index $n_H=2.32$), $SiO_2$ thin films L3 having low refractive index (refractive index $n_L=1.46$), and $Al_2O_3$ thin films M3 having intermediate refractive index (refractive index $n_m=1.66$) are laminated in 35 layers on a substrate 21 in order of $TiO_2$—$Al_2O_3$—$SiO_2$—$TiO_2$—$Al_2O_3$ . . . as illustrated in Table 3.

In this case, the average film thicknesses of the $TiO_2$ films made of material having high refractive index and the $SiO_2$ films made of material having low refractive index are as follows. The average film thickness of the $TiO_2$ films is $d_H=(42\times10+46+23)/12=40.8$ nm. The average film thickness of the $SiO_2$ films is $d_L=(42\times10+118+42+85)/13=51.2$ nm. Supposing a reference wavelength $\lambda_0=550$ nm in a working wavelength band, the above-mentioned calculation results satisfy the conditional expression (1). In addition, the film thickness ratio m becomes 0.44, which satisfies the conditional expression (4).

Figure 12A:
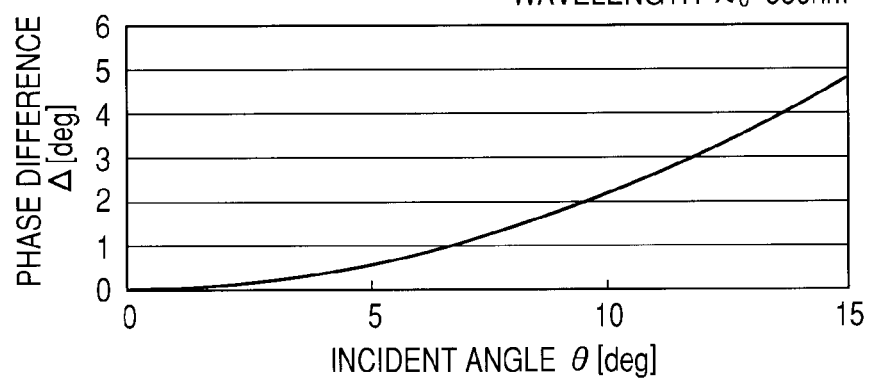
FIGS. 12A, 12B and 12C are graphs illustrating optical characteristics of a laminated thin film according to Embodiment 5.
Figure 12B:
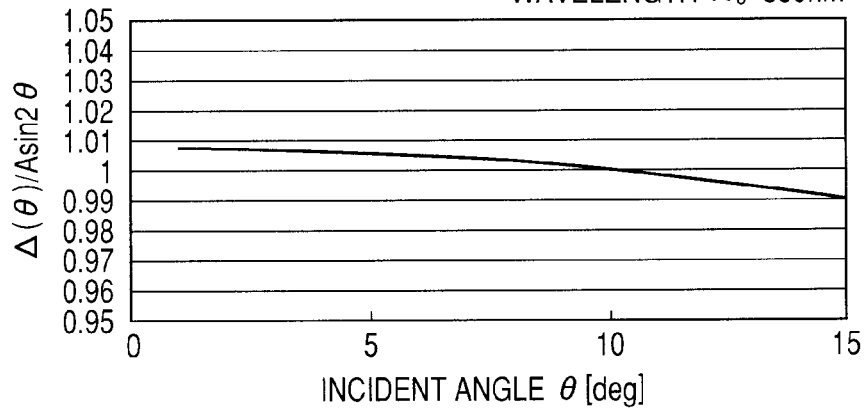
Figure 12C:
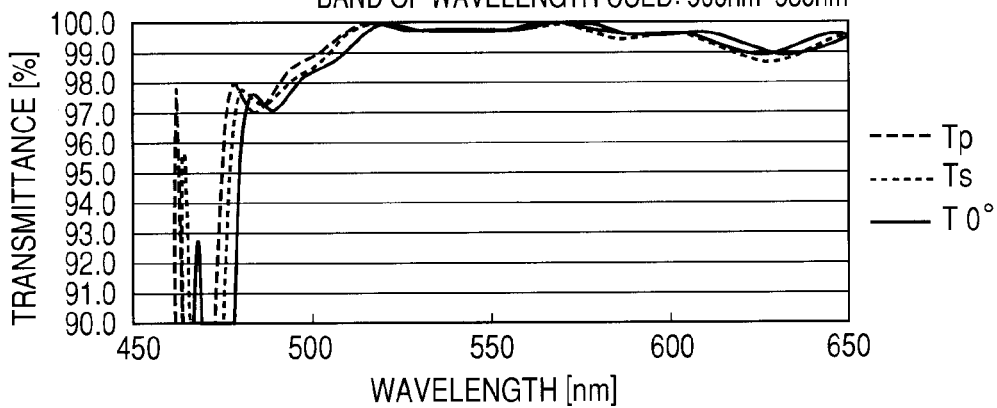

FIG. 12A is a graph in which the phase difference $\Delta(\theta)$ received by the light ray entering the laminated thin film of Embodiment 5 at an angle $\theta$ is plotted on the plane of the vertical axis A and the horizontal axis $\theta$. FIG. 12B illustrates a result of plotting the characteristics on the plane of the horizontal axis θ and the vertical axis $\Delta(\theta)/A \sin^2\theta$. In addition, FIG. 12C shows the spectral transmittances T0°, Tp, and Ts of P- and S-polarized light rays of when the incident angle θ in Embodiment 5 is 0 and 15 degrees.

As understood from FIG. 12A, the phase difference of when the incident angle θ is 10 degrees becomes $|\Delta(10°)|=2.2$ degrees, which satisfies the conditional expression (3). As understood from FIG. 12B, the laminated thin film of Embodiment 5 satisfies the conditional expression (2). In addition, as understood from the spectral transmittance of FIG. 12C, 95% or higher transmittance is exhibited in the working wavelength band (500 to 580 nm). The laminated thin film of Embodiment 5 has the structure in which the thin films made of materials of three different types are laminated in 35 layers. Thus, the phase characteristics equivalent to those of Embodiments described above can be obtained.

COMPARISON EXAMPLE

Figure 13:
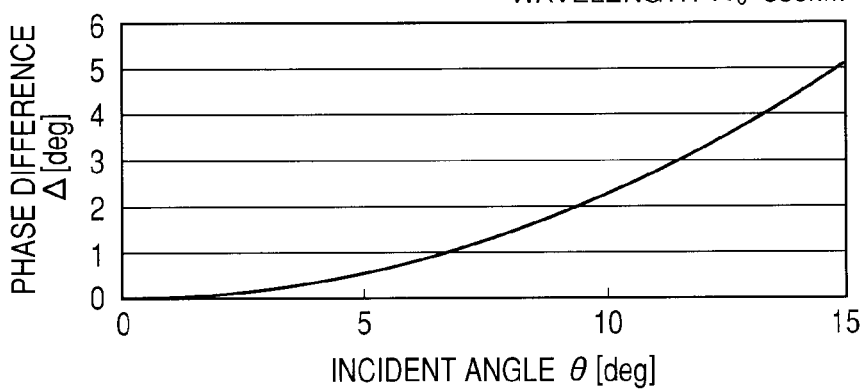
FIG. 13 is a graph illustrating incident angle characteristics of a phase difference in a comparison example.

Here, as a comparison example, FIG. 13 illustrates incident angle characteristics of the phase difference in the case where the low refractive index thin films made of $SiO_2$ and the high refractive index thin films made of $TiO_2$ are laminated in 112 layers with each film thickness 15 nm of the single layer, in the working wavelength band of 500 to 580 nm ($\lambda_0$=550 nm). In addition, Table 6 shows structures of the laminated thin films of the comparison example, Embodiment 1, Embodiment 4, and Embodiment 5. The film thickness 15 nm of the comparison example is sufficiently thin with respect to the working wavelength band, and hence the laminated thin film of the comparison example can be handled as a birefringence structure. Concerning the incident angle characteristics of the phase difference of the comparison example, it is understood from comparison between FIG. 13 and FIG. 5A for example that the phase characteristics equivalent to those in Embodiment 1 can be obtained. However, it is understood from comparison of the structures that the equivalent phase characteristics can be obtained by 112 laminated layers in the comparison example with a total film thickness of approximately 1,800 nm, while 27 laminated layers in Embodiment 1 with a total film thickness of 1,311 nm. In other words, Embodiment 1 can reduce the number of laminated layers to ¼ or less, and can reduce the total film thickness by approximately 30% compared with the comparison example, while expecting the phase compensation effect equivalent to those of the comparison example. Also in other embodiments, the number of laminated layers and the total film thickness can be reduced largely compared with the comparison example. Thus, the laminated thin film of the present invention can reduce manufacturing cost largely compared with the conventional laminated thin film using the structural birefringence.

[Embodiment 6]

An embodiment of using a device including the laminated thin film of the present invention for a liquid crystal projector is described below.

Figure 14A:
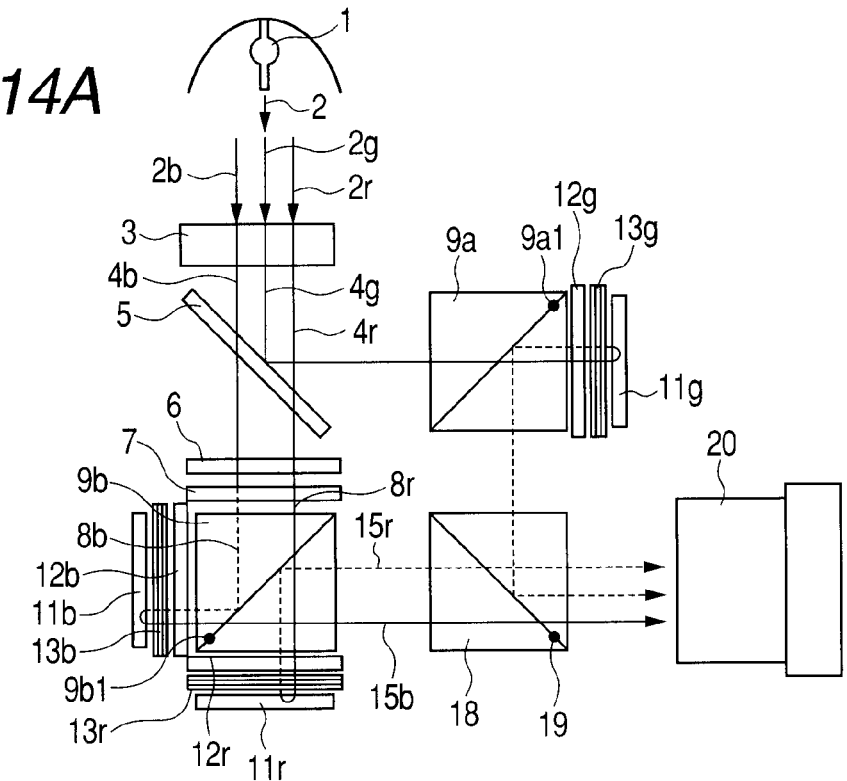
FIGS. 14A and 14B are schematic structural diagrams of a reflection type liquid crystal image display device including the laminated thin film according to the present invention.

FIG. 14A is a schematic diagram of a structure of the liquid crystal projector according to Embodiment 6, in which the device having the laminated thin film of the present invention is used. In FIG. 14A, incident light 2 from a light source 1 contains green color light 2g, blue color light 2b, and red color light 2r. Those light rays are converted in polarization by a polarization conversion device 3 to be green color light 4g, blue color light 4b, and red color light 4r. In the optical path, there are provided a dichroic mirror 5, a polarization plate 6, a wavelength selective phase difference plate 7, a polarization beam splitter 9a for green color, and a polarization beam splitter 9b for blue and red colors. In addition, a liquid crystal display device 11, a ¼ wavelength plate 12, a device 13 having the laminated thin film of the present invention, a phase plate 14 of the present invention, a combining prism 18, and a projection lens optical system 20 are provided.

The light emitted from the light source 1 is reflected by a reflector to be substantially parallel light 2, which enters the polarization conversion device 3. In FIG. 14A, this white color light 2 is illustrated as three primary color light rays of green color light 2g, blue color light 2b, and red color light 2r. Though those green, blue, and red color light rays are separated spatially in FIG. 14A for convenience sake, those three light rays are actually not separated spatially at this stage. Hereinafter, the green color light is denoted by G, the blue color light is denoted by B, and the red color light is denoted by R.

The individual color light rays emitted from the light source contain various polarized light rays and pass through the polarization conversion device 3 to be converted into light rays having uniform polarization directions, i.e., the G polarized light 4g, the B polarized light 4b, and the R-polarized light 4r, which enter the dichroic mirror 5. The dichroic mirror 5 has characteristics of reflecting only G band light, and hence the G polarized light is reflected, while the R and B polarized light rays pass through the dichroic mirror 5. Thus, the G polarized light is separated in color. The G polarized light directly enters the polarization beam splitter 9a, and passes through the ¼ wavelength plate 12g and the laminated thin film 13g to irradiate a G liquid crystal display device 11g. The R and B polarized light rays separated in color pass through the polarization plate so as to improve the degree of polarization, and afterward enter the color selective phase plate 7. The color selective phase plate 7 has characteristics of converting the polarization direction by 90 degrees only for the B polarized light. Thus, a polarization state of the R polarized light is maintained while the B polarized light is rotated by 90 degrees in the polarization direction and enters the polarization beam splitter 9b. The polarization beam splitters 9a and 9b transmit the P-polarized light and reflects the S-polarized light. A polarization separation surface 9b1 of the polarization beam splitter 9b reflect the B polarized light and transmits the R polarized light so that the color separation is performed. The light rays pass through the ¼ wavelength plates 12b and 12r and the laminated thin films 13b and 13r to irradiate the liquid crystal display devices 11b and 11r corresponding to individual colors. Each of the light rays irradiating the liquid crystal display devices 11b, 11r, and 11g is converted in the polarization direction by 90 degrees for each pixel in accordance with the image signal and is reflected to be the image light. The B and R image light rays pass through the ¼ wavelength plates 12b and 12r and the laminated thin films 13b and 13r again, and then enter the polarization beam splitter 9b again. The image light of the B polarized light passes through the polarization beam splitter 9b to be blue color light 15b, while the image light of the R polarized light is reflected by the polarization separation surface 9b1 to be red color light 15r. Those light rays go out from the polarization beam splitter 9b so that the light rays 15b and 15r are combined. The image light of the G polarized light also passes through the ¼ wavelength plate 12g and the laminated thin film 13g, and then is reflected by the polarization separation surface 9a1 of the polarization beam splitter 9a and enters the combining prism 18. The G image light is reflected by the dichroic film 19 in the combining prism, while the R and B light lays 15b and 15r pass through the combining prism so that the G, R, and B light rays are combined to go out. The color-combined image light is projected to the screen and forms an image by the projection lens optical system 20.

Here, it is desirable that the polarization beam splitter utilizing the structural birefringence is used for the polarization beam splitters 9a and 9b in the liquid crystal projector of this embodiment. As the polarization beam splitter utilizing the structural birefringence, the structure described in Japanese Patent Application Laid-Open No. 2006-133402 is known, which includes a one-dimensional lattice structure of a period of a minimum wavelength or smaller in the working wavelength band in the in-plane direction of the polarization separation plane. The polarization beam splitter using the structural birefringence has a good angle characteristics so that the F number of the light ray can be small compared with the conventional one using the dielectric multilayered film. Therefore, light amount can be increased. In this case, the incident angle increases so that influence of leakage light due to grazing incidence is also increased. However, by performing integral phase compensation, the leakage light can be reduced effectively. In other words, if optimal phase compensation is performed by combining the polarization beam splitter utilizing the structural birefringence and the laminated thin film, a liquid crystal projector that is bright with large light amount and has high contrast can be obtained.

Figure 14B:
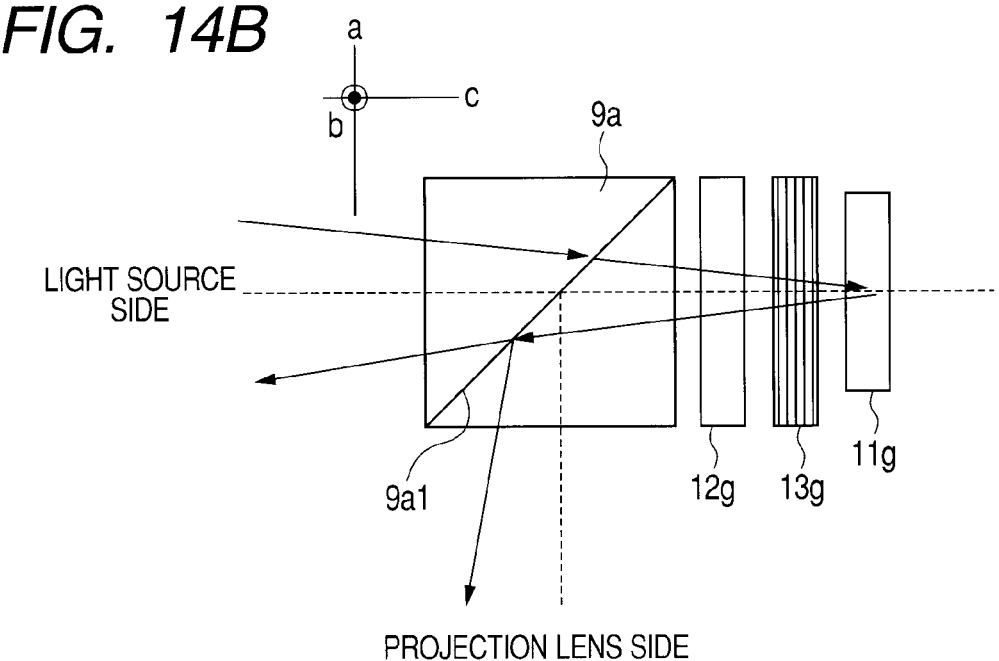

FIG. 14B illustrates a device arrangement at a vicinity of the liquid crystal display device in the G optical path. The arrow line in FIG. 14B indicates an incident light ray. The ¼ wavelength plate 12g is disposed between the liquid crystal display device 11g and the polarization beam splitter 9a. The laminated thin film 13g of the present invention is disposed between the ¼ wavelength plate 12g and the liquid crystal display device 11g. The ¼ wavelength plate 12g performs the phase compensation for leakage light due to the polarization beam splitter 9a, while the laminated thin film 13g performs the phase compensation mainly for leakage light due to liquid crystal display device 11g. The arrangement and the effect of devices in the B and the R optical paths are the same as those in the G optical path. In the following description, the G optical path is exemplified for description of actions of individual devices.

Here, a three-dimensional space is expressed by the a-axis, the b-axis, and the c-axis. The surface normal direction of the reflection type liquid crystal display device is represented by the c-axis, the direction that is perpendicular to both the normal direction of the polarization separation surface of the polarization beam splitter and the c-axis is represented by the b-axis, and the direction that is perpendicular to both the c-axis and the b-axis is represented by the a-axis. In this case, the ¼ wavelength plate 12g and the laminated thin film 13g are arranged so that the normal of the surface becomes parallel to the c-axis.

Figure 15:
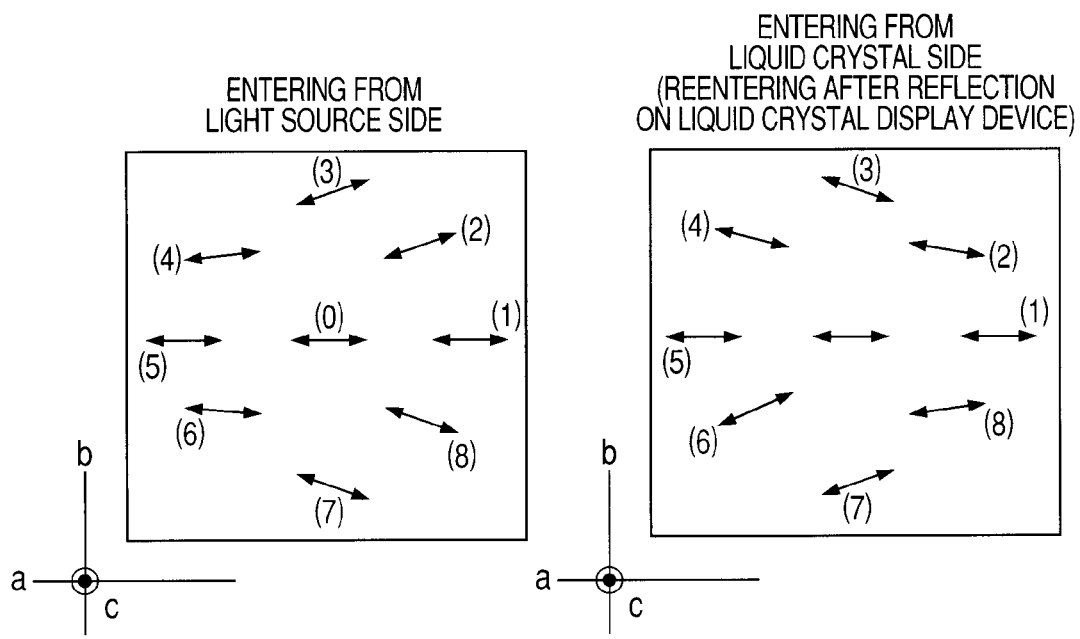
FIG. 15 is a schematic diagram illustrating angle dependency of a polarization beam splitter in a transmission polarization direction.

It is supposed that the light ray enters at an angle with respect to the c-axis as illustrated in FIG. 14B. Usually, the separation surface for the polarization separation is inclined with respect to the c-axis by 45 degrees. The polarization separation surface transmits the P-polarized light by the Brewster angle and reflects the S-polarized light. When the polarization beam splitter having such characteristics separates the polarized light entering at an angle with respect to the c-axis, the directions of the P- and S-polarizations vary in accordance with the incident angle, i.e., the incident direction, and hence the polarization direction of the separated light also varies. FIG. 15 is a schematic diagram illustrating a variation of the transmission polarization direction in accordance with the incident angle, i.e., the incident direction of the light ray entering the polarization beam splitter. In FIG. 15, "0" indicates the case where the light ray enters in parallel to the c-axis, and others indicate the case where the light ray enters at an angle with respect to the c-axis. The numbers of (1) to (8) indicate that the incident direction angle is different. The direction angle means an angle between the incident light ray projected onto the ab plane and the a-axis. The case (1) corresponds to 0 degrees, and the incident direction varies by 45 degrees step by step from (1) to (8). In addition, the left side of FIG. 15 schematically indicates the transmission polarization direction when the light ray enters from the light source side, while the right side of FIG. 15 schematically indicates the transmission polarization direction when the light ray is reflected by the liquid crystal display device and then enters the polarization beam splitter again. As understood from FIG. 15, the direction of the light separated by the polarization beam splitter is inclined if the light ray enters from the direction other than (1) or (5). Further, the angle between the direction of the incident light and the normal direction of the polarization separation surface is different between the case where the light ray enters the polarization beam splitter from the light source side and the case where the light ray is reflected by the liquid crystal and reenters. Therefore, when the light ray entering from the direction other than the direction (1) or (5) is reflected by the liquid crystal device and reenters the polarization beam splitter, not the entire light can pass through the polarization beam splitter, and hence leakage light occurs.

Here, the ¼ wavelength plate 12g disposed between the polarization beam splitter 9a and the liquid crystal display device 11g compensates for the polarization direction inclined by the polarization beam splitter 9a. The ¼ wavelength plate 12g is disposed so that the optical axis thereof is substantially parallel to or substantially perpendicular to the a-axis or the b-axis. The light ray that enters the polarization beam splitter 9a at an angle with respect to the c-axis and is polarized in the inclined direction passes to and fro through the ¼ wavelength plate 12g, and hence the inclined direction is rotated to be symmetric with respect to the optical axis of the ¼ wavelength plate. As a result, the polarization direction when the light ray enters the polarization beam splitter from the light source side and the polarization direction when the light ray enters the polarization beam splitter from the liquid crystal side are aligned. As a result, an angle difference between the incidence and the emergence is reduced, and a leakage light component reflected by the polarization beam splitter 9a is reduced, and hence the contrast is improved. In addition, if the optical axis of the ¼ wavelength plate 12g is rotated from the arrangement direction by a very small angle of approximately 1 degree in the ab plane, an influence of the pretilt angle of the liquid crystal molecules in the black display state can be canceled so that higher contrast can be obtained.

Next, the leakage light due to the liquid crystal display device 11g is described. The liquid crystal display device 11g has positive anisotropy, and the optical axis of the liquid crystal molecules are substantially parallel to the c-axis in the black display state. The linearly polarized light that passes through the polarization beam splitter 9a and obliquely enters the liquid crystal display device in the black display state undergoes the phase variation in accordance with the incident angle by the anisotropy of the liquid crystal molecules. The light ray that is converted from the linearly polarized light into an elliptically polarized light by the phase variation cannot entirely pass through the polarization beam splitter, and hence a part of the light ray reaches the projection lens system. Therefore, leakage light occurs even in the black display state, thereby resulting in a decrease of contrast. In addition, the ¼ wavelength plate 12g disposed at a vicinity of the liquid crystal display device also has an anisotropy and affects the phase of the oblique incident light.

Here, the laminated thin film 13g disposed between the liquid crystal display device 11g and the ¼ wavelength plate 12g compensates for the phase variation due to the liquid crystal display device 11g. Simultaneously, the unwanted phase variation in the oblique incidence due to the ¼ wavelength plate 12g is also compensated. The polarized light ray that passes to and fro through the liquid crystal display device 11g, the laminated thin film 13g, and the ¼ wavelength plate 12g is converted from the elliptically polarized light into the linearly polarized light by the phase compensation and enters the polarization beam splitter 9a. As a result, the leakage light component is reduced, and hence the contrast can be improved.

The laminated thin film 13g acts on both the ¼ wavelength plate 12g and the liquid crystal display device 11g. Therefore, as illustrated in FIG. 14B, the laminated thin film 13g is disposed between the ¼ wavelength plate 12g and the liquid crystal display device 11g. If the laminated thin film 13g is disposed at the position closer to the polarization beam splitter than the ¼ wavelength plate 12g, the compensation relationship is changed by the ¼ wavelength plate 12g disposed between the liquid crystal display device 11g and the laminated thin film 13g, which is not desirable.

When the laminated thin film and the ¼ wavelength plate are disposed as illustrated in FIG. 14A, the contrast value of the liquid crystal projector is improved from 2,000:1 to 4,000:1 compared with the case where only the ¼ wavelength plate is disposed (the case where the laminated thin film is removed in FIG. 10A).

The substrate forming the laminated thin film may be the protection glass of the liquid crystal display device 11g or on the liquid crystal display device side of the ¼ wavelength plate 12g. In this case, each device and the laminated thin film are integrated optically, and hence one unit can perform the phase compensation. In addition, reflection at the interface can be reduced so that higher contrast can be obtained.

Next, characteristics of the phase plate according to the present invention are described below.

[Embodiment 7]

Figure 16:
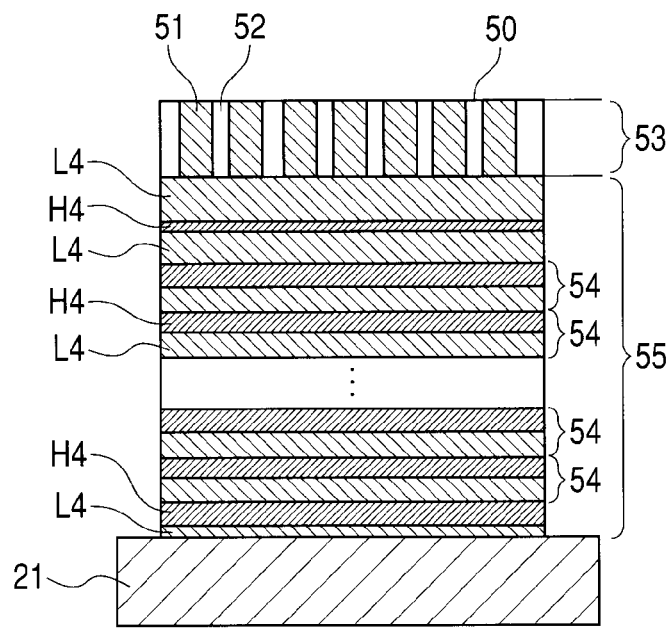
FIG. 16 is a schematic structural diagram illustrating a form of Embodiment 7.

FIG. 16 is a schematic diagram illustrating a form of a phase plate according to Embodiment 7 of the present invention that is used in the wavelength band 500 to 580 nm. In addition, Table 7 shows design values of Embodiment 7. The hatched portion in Table 7 corresponds to the repetition layer 54 in FIG. 16.

The phase plate in Embodiment 7 includes a laminated thin film 55 having a structure in which $TiO_2$ thin films H4 having high refractive index (refractive index of 2.32) and $SiO_2$ thin films L4 having low refractive index (refractive index of 1.46) are laminated alternately in 40 layers on the substrate 21 as illustrated in FIG. 16. The average film thicknesses of the individual layers of the laminated thin film 55 of Embodiment 7 are as follows. The average film thickness of the $TiO_2$ films is $d_H$=(45×16+42×13+146+35)/20=47.8 nm. The average film thickness of the $SiO_2$ films is $d_L$=(45×17+26+57)/19=44.6 nm. Supposing that a reference wavelength in the working wavelength band is 550 nm, the conditional expression (1) is satisfied. In addition, the film thickness ratio m becomes 0.52, which satisfies the conditional expression (4).

In addition, a one-dimensional lattice structure portion 53 having a period of minimum wavelength or smaller in the working wavelength band is formed on the upper surface of the laminated thin film 55. In Embodiment 7, the one-dimensional lattice structure portion 53 having a lattice period of 180 nm, a lattice height of 510 nm, and a width 146 nm of a lattice portion 51 is formed. The lattice portion 51 is made of $TiO_2$, and a lattice portion 52 is made of air.

The one-dimensional lattice structure portion 53 has anisotropy in the direction parallel to the lattice as well as in the direction perpendicular to the lattice by the structural birefringence. The value of the anisotropy can be handled as the effective refractive index. The effective refractive index of the polarization in the direction parallel to the lattice is $n_{TE}$=1.90, and the effective refractive index of the polarization in the direction perpendicular to the lattice is $n_{TM}$=2.17. When the lattice height is 510 nm, the value of $\Delta n \cdot d$ is obtained as follows.

$$\Delta n \cdot d = (2.17 - 1.90) \times 510 \text{ nm} = 136.7 \text{ nm}$$

The one-dimensional lattice structure portion of Embodiment 7 acts as substantially the ¼ wavelength plate on the light ray having the reference wavelength 550 nm entering the phase plate perpendicularly.

Figure 17A:
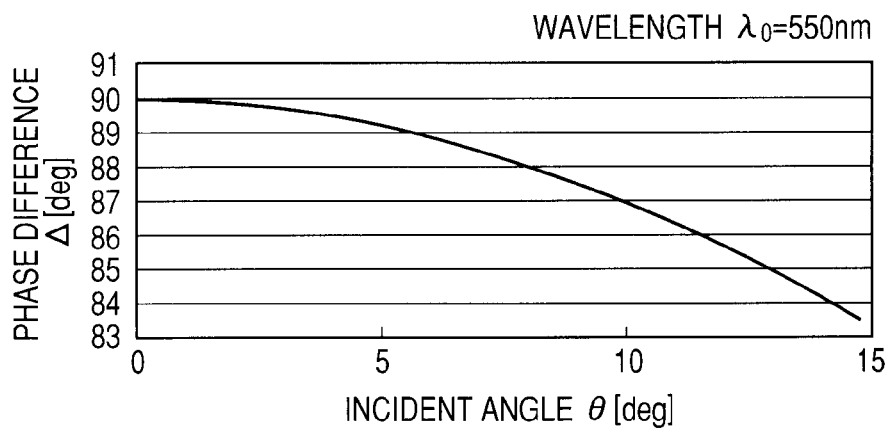
FIGS. 17A, 17B and 17C are graphs illustrating optical characteristics of a laminated thin film according to Embodiment 7.
Figure 17B:
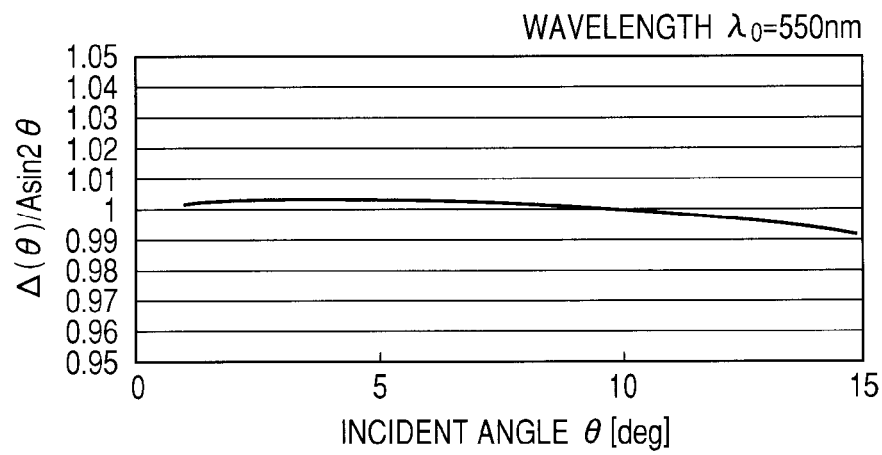

FIG. 17A is a diagram in which the phase difference $\Delta(\theta)$ received by the light ray entering the phase plate of Embodiment 7 at an angle $\theta$ is plotted on the plane of the vertical axis A and the horizontal axis $\theta$. In addition, FIG. 17B illustrates a result of plotting the same characteristics on the plane of the horizontal axis $\theta$ and the vertical axis $\Delta(\theta)/A \sin^2\theta$.

$(B-\Delta)/A \sin^2\theta$ in the conditional expression (5) is a value indicating a deviation from the $\sin^2\theta$ curve with respect to the phase difference incident angle characteristics of the phase plate. Here, the coefficient $A=(B-\Delta(10°))/\sin^2\theta$, which indicates a coefficient at $\theta=10$ degrees when $B-\Delta(\theta)$ is fitted by $\sin^2\theta$. The phase difference B indicates a phase difference of the phase plate with respect to the light ray of $\theta=0$ degrees, and $B=\Delta(0°)$. In this embodiment, $B=\Delta(0°)=90$ degrees. In the range satisfying $0<\theta\leq15$ degrees, the variation of the phase characteristics follows $\sin^2\theta$ approximately. In order to perform the phase compensation smoothly with respect to the incident angle, it is desirable that a value of $(B-\Delta)/A \sin^2\theta$ is close to one, and actually satisfies the conditional expression (5). If the conditional expression (5) is not satisfied, the phase characteristics are deviated from the $\sin^2\theta$ curve, which is not desired because a disadvantageous influence is given to the phase compensation.

In addition, in order to obtain the phase compensation effect as a phase plate, it is desirable that a value of the phase difference $(B-\Delta(10°))$ ruled at the incident angle of 10 degrees is 2 degrees or larger. If the value of $(B-\Delta(10°))$ is smaller than 2 degrees, the obtained phase compensation effect is also decreased. In this case, though it is useful as a 1/4 wavelength plate, sufficient effect cannot be expected as a phase plate for performing the phase compensation for the oblique incidence.

$$0.95 \leq \frac{B - \Delta(\theta)}{A\sin^2\theta} \leq 1.05 \tag{5}$$

where, $$A = \frac{B - \Delta(10°)}{\sin^2(10°)}, \ |B - \Delta(10°)| \geq 2.0 \text{(degrees)}, \ B = \Delta(0°). \tag{6}$$

The upper limit and the lower limit on the vertical axis in FIG. 17B correspond to the upper limit and the lower limit in the conditional expression (5). Embodiment 1 satisfies the conditional expression (2) in the entire range of $0<\theta\leq15$ degrees. In addition, the phase difference at the incident angle $\theta=10$ degrees becomes $|B-\Delta(10°)|=2.9$ degrees, which satisfies the conditional expression (6).

Figure 17C:
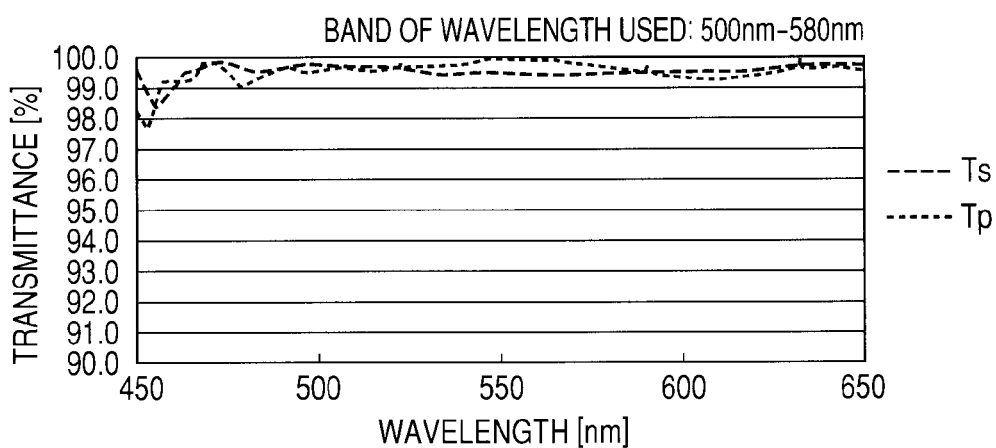

FIG. 17C illustrates the spectral transmittances Tp and Ts of the P- and S-polarized light rays when the incident angle θ is 0 degree in the laminated thin film 55 of Embodiment 7. Film thicknesses of a few layers close to the interface with the one-dimensional lattice structure portion among the laminated thin film 55 are adjusted, and hence 95% or higher transmittance is obtained in the working wavelength band. As to the upper surface of the one-dimensional lattice structure portion 53, the lattice surface is integrated with other substrate, and hence reflection can be suppressed. In addition, reflection can be suppressed also by laminating one-dimensional lattices made of different materials of different refractive indexes or by forming a fine uneven shape equal to or smaller than the lattice period on the upper surface of the lattice.

[Embodiment 8]

Embodiment 8 is related to a phase plate that is used in the wavelength band 400 to 480 nm. The general structure thereof is the same as that of Embodiment 7. Therefore, it is described with reference to FIG. 16 similarly to Embodiment 7. In addition, Table 8 shows design values of Embodiment 8. The hatched portion in Table 8 corresponds to the repetition layer 54.

The phase plate in Embodiment 8 includes a laminated thin film 55 having a structure in which $TiO_2$ thin films H4 having high refractive index (refractive index of 2.42) and $SiO_2$ thin films L4 having low refractive index (refractive index of 1.47) are laminated alternately in 45 layers on the substrate 21 as illustrated in FIG. 16. The average film thicknesses of the individual layers of the laminated thin film 55 of Embodiment 8 are as follows. The average film thickness of the $TiO_2$ films is $d_H=(33\times19+110+32+19)/22=35.8$ nm. The average film thickness of the $SiO_2$ films is $d_L=(33\times19+21+33+19)/22=31.8$ nm. Supposing that a reference wavelength in the working wavelength band is 450 nm, the conditional expression (1) is satisfied. In addition, the film thickness ratio m becomes 0.53, which satisfies the conditional expression (4).

A one-dimensional lattice structure portion 53 having a period of minimum wavelength or smaller in the working wavelength band is formed on the upper surface of the laminated thin film 55. In Embodiment 8, the one-dimensional lattice structure portion 53 having a lattice period of 145 nm, a lattice height of 406 nm, and a width 120 nm of a lattice portion 51 is formed. The lattice portion 51 is made of $TiO_2$, and a lattice portion 52 is made of air.

The one-dimensional lattice structure portion 53 has anisotropy in the direction parallel to the lattice as well as in the direction perpendicular to the lattice by the structural birefringence. The value of the anisotropy can be handled as the effective refractive index. The effective refractive index of the polarization in the direction parallel to the lattice is $n_{TE}=2.00$, and the effective refractive index of the polarization in the direction perpendicular to the lattice is $n_{TM}=2.28$. When the lattice height is 406 nm, the value of Δn·d is obtained as follows.

$$\Delta n \cdot d = (2.28-2.00) \times 406 \text{ nm} = 113.7 \text{ nm}$$

The one-dimensional lattice structure portion of Embodiment 8 acts as substantially the 1/4 wavelength plate on the light ray having the wavelength 450 nm entering the phase plate perpendicularly.

Figure 18A:
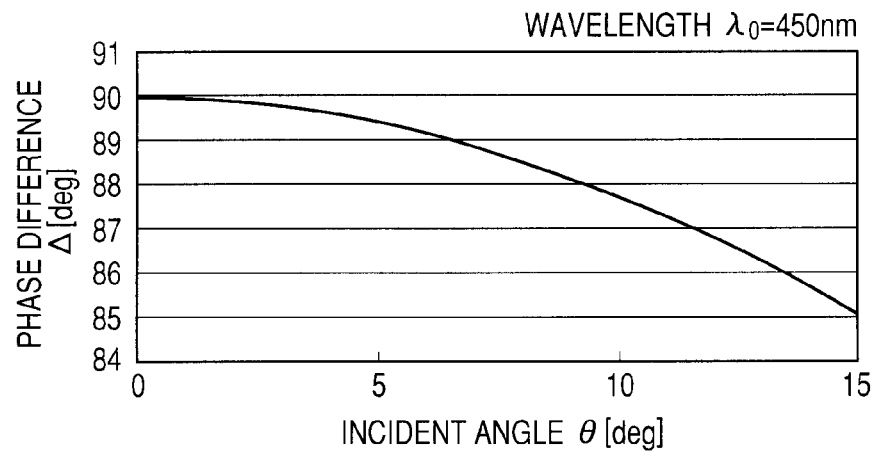
FIGS. 18A, 18B and 18C are graphs illustrating optical characteristics of a laminated thin film according to Embodiment 8.

FIG. 18A is a diagram in which the phase difference Δ(θ) received by the light ray entering the phase plate of Embodiment 8 at an angle θ is plotted on the plane of the vertical axis A and the horizontal axis θ. In addition, FIG. 18B illustrates a result of plotting the same characteristics on the plane of the horizontal axis θ and the vertical axis Δ(θ)/A sin²θ.

Figure 18B:
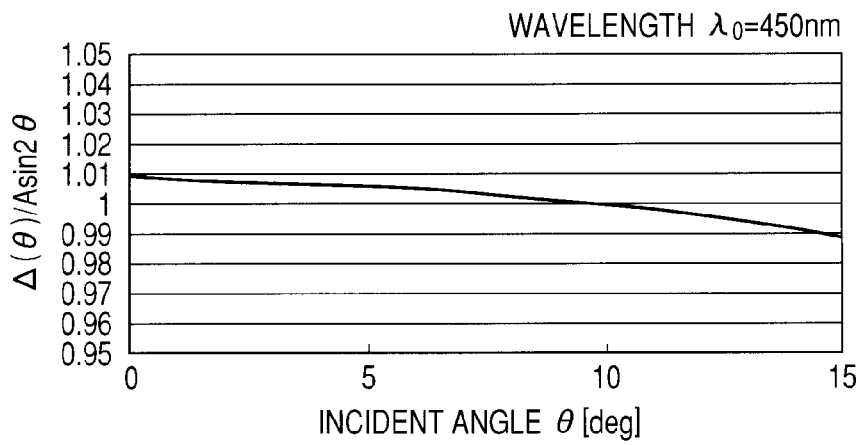

As understood from FIG. 18B, the phase plate of Embodiment 8 satisfies the conditional expression (5). In addition, the phase difference at the incident angle θ=10 degrees becomes |B-Δ(10°)|=2.3 degrees, which satisfies the conditional expression (6).

Figure 18C:
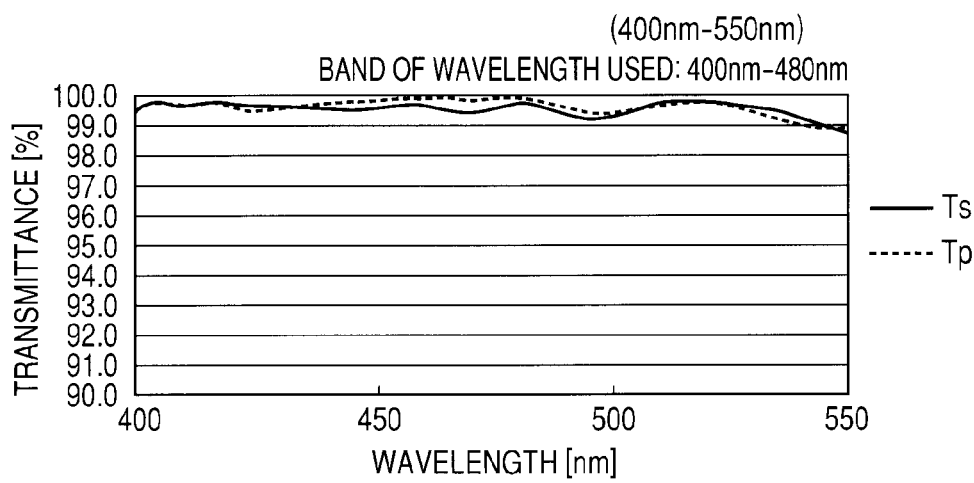

FIG. 18C illustrates the spectral transmittances Tp and Ts of the P- and S-polarized light rays when the incident angle θ is 0 degree in the laminated thin film 55 of Embodiment 8 illustrated in FIG. 16. Film thicknesses of a few layers close to the interface with the one-dimensional lattice structure portion among the laminated thin film 55 are adjusted, and hence 95% or higher transmittance is obtained in the working wavelength band.

[Embodiment 9]

Embodiment 9 is related to a phase plate that is used in the wavelength band 600 to 680 nm. The general structure thereof is the same as that of Embodiment 7. Therefore, it is described with reference to FIG. 16 similarly to Embodiment 7. In addition, Table 9 shows design values of Embodiment 9. The hatched portion in Table 9 corresponds to the repetition layer 54.

The phase plate in Embodiment 9 includes a laminated thin film 55 having a structure in which $TiO_2$ thin films H4 having high refractive index (refractive index of 2.42) and $SiO_2$ thin films L4 having low refractive index (refractive index of 1.47) are laminated alternately in 32 layers on the substrate 21 as illustrated in FIG. 16.

The average film thicknesses of the individual layers of the laminated thin film 55 of Embodiment 9 are as follows. The average film thickness of the $TiO_2$ films is $d_H=(57\times12+162+48+42+14)/16=61.5$ nm. The average film thickness of the $SiO_2$ films is $d_L=(57\times12+44+57+76)/15=48.1$ nm. Supposing that a wavelength is 650 nm, the conditional expression (1) is satisfied. In addition, the film thickness ratio m becomes 0.56, which satisfies the conditional expression (4).

In addition, a one-dimensional lattice structure portion 53 having a period of wavelength smaller than the working wavelength is formed on the upper surface of the laminated thin film 55. In Embodiment 9, the one-dimensional lattice structure portion 53 having a lattice period of 230 nm, a lattice height of 637 nm, and a width 182 nm of a lattice portion 51 is formed. The lattice portion 51 is made of $TiO_2$, and a lattice portion 52 is made of air.

The one-dimensional lattice structure portion 53 has anisotropy in the direction parallel to the lattice as well as in the direction perpendicular to the lattice by the structural birefringence. The value of the anisotropy can be handled as the effective refractive index. The effective refractive index of the polarization in the direction parallel to the lattice is $n_{TE}=1.85$, and the effective refractive index of the polarization in the direction perpendicular to the lattice is $n_{TM}=2.11$. When the lattice height is 637 nm, the value of Δn·d is obtained as follows.

$$\Delta n \cdot d = (2.11-1.85) \times 637 \text{ nm} = 165.6 \text{ nm}$$

The one-dimensional lattice structure portion of Embodiment 9 acts as substantially the 1/4 wavelength plate on the light ray having the wavelength 650 nm entering the phase plate perpendicularly.

Figure 19A:
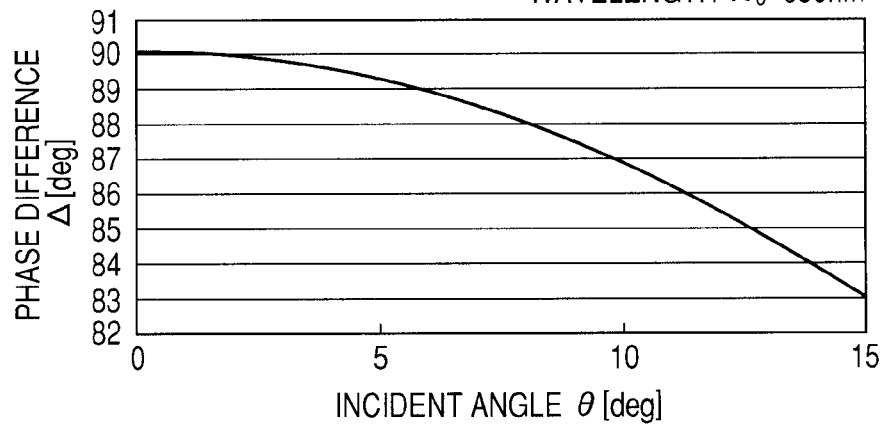
FIGS. 19A, 19B and 19C are graphs illustrating optical characteristics of a laminated thin film according to Embodiment 9.

FIG. 19A is a diagram in which the phase difference Δ(θ) received by the light ray entering the phase plate of Embodiment 9 at an angle θ is plotted on the plane of the vertical axis A and the horizontal axis θ. In addition, FIG. 19B illustrates a result of plotting the characteristics on the plane of the horizontal axis θ and the vertical axis Δ(θ)/A sin²θ.

Figure 19B:
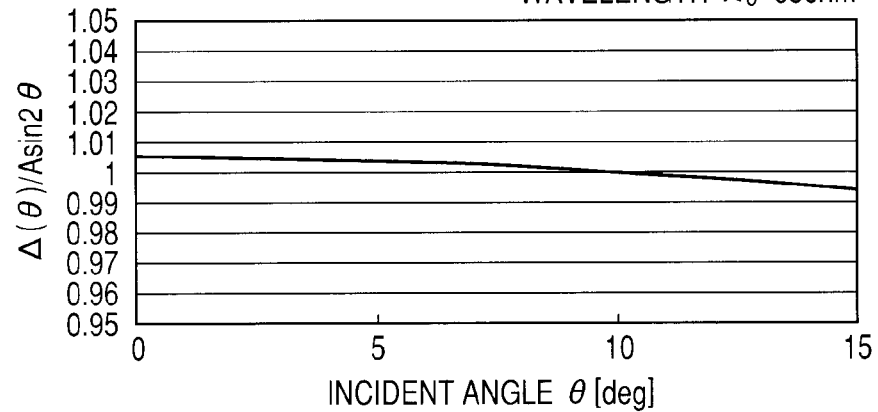

As understood from FIG. 19B, the phase plate of Embodiment 9 satisfies the conditional expression (5). In addition, the phase difference at the incident angle θ=10 degrees becomes |B-Δ(10°)|=3.1 degrees, which satisfies the conditional expression (6).

Figure 19C:
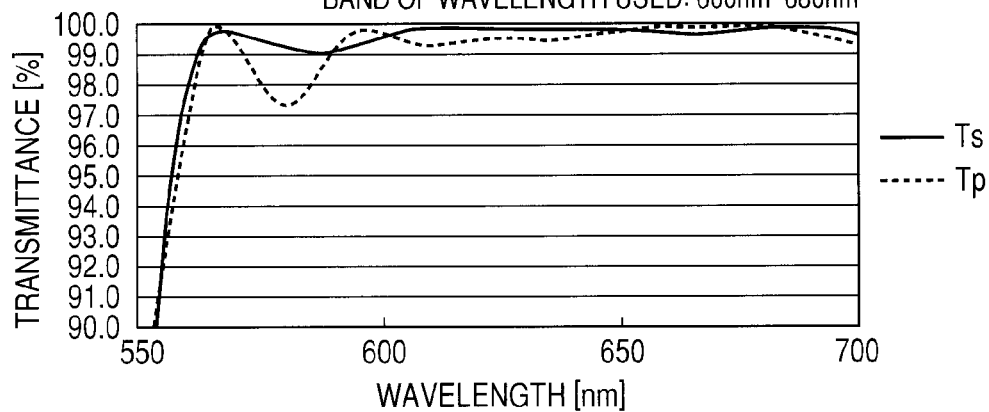

FIG. 19C illustrates the spectral transmittances Tp and Ts of the P- and S-polarized light rays when the incident angle θ is 0 degree in the laminated thin film 55 of Embodiment 9 illustrated in FIG. 16. Film thicknesses of a few layers close to the interface with the one-dimensional lattice structure portion among the laminated thin film 55 are adjusted, and hence 95% or higher transmittance is obtained in the working wavelength band.

[Embodiment 10]

An embodiment of using the phase plate of the present invention for the liquid crystal projector is described below.

Figure 20A:
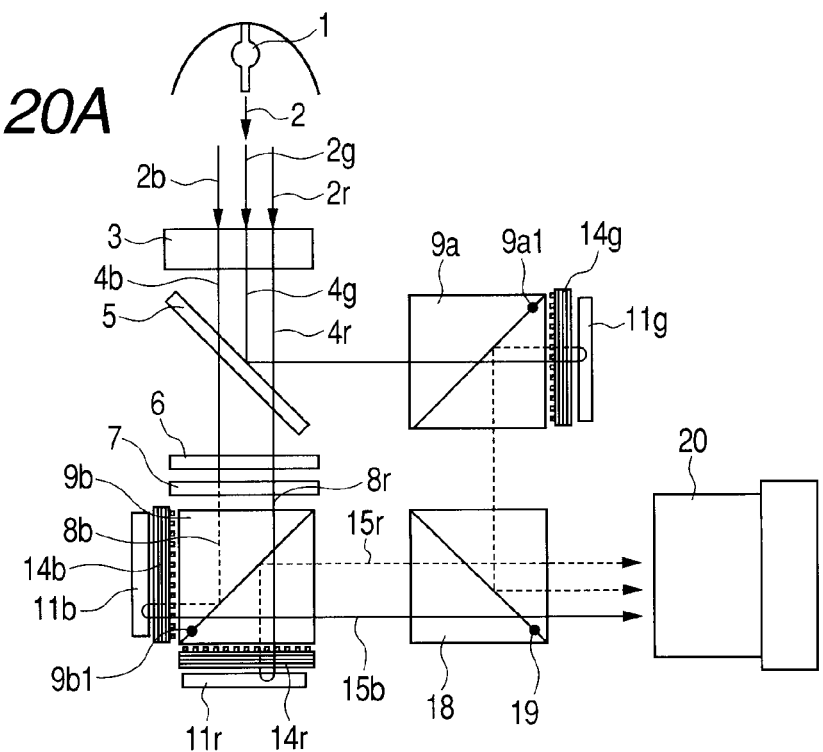
FIGS. 20A and 20B are schematic structural diagrams of a reflection type liquid crystal image display device including a phase plate according to the present invention.

FIG. 20A is a schematic diagram of a structure of the liquid crystal projector according to Embodiment 10, in which the device having the phase plate of the present invention is used.

The structure of the liquid crystal projector illustrated in FIG. 20A corresponds to the structure in which the ¼ wavelength plates 12g, 12b and 12r, and the laminated thin films 13g, 13b and 13r are replaced with the phase plates 14g, 14b and 14r in the structure of the liquid crystal projector of Embodiment 6 illustrated in FIG. 14A. Other structures are the same as those of the reflection type liquid crystal projector illustrated in FIG. 14A.

Figure 20B:
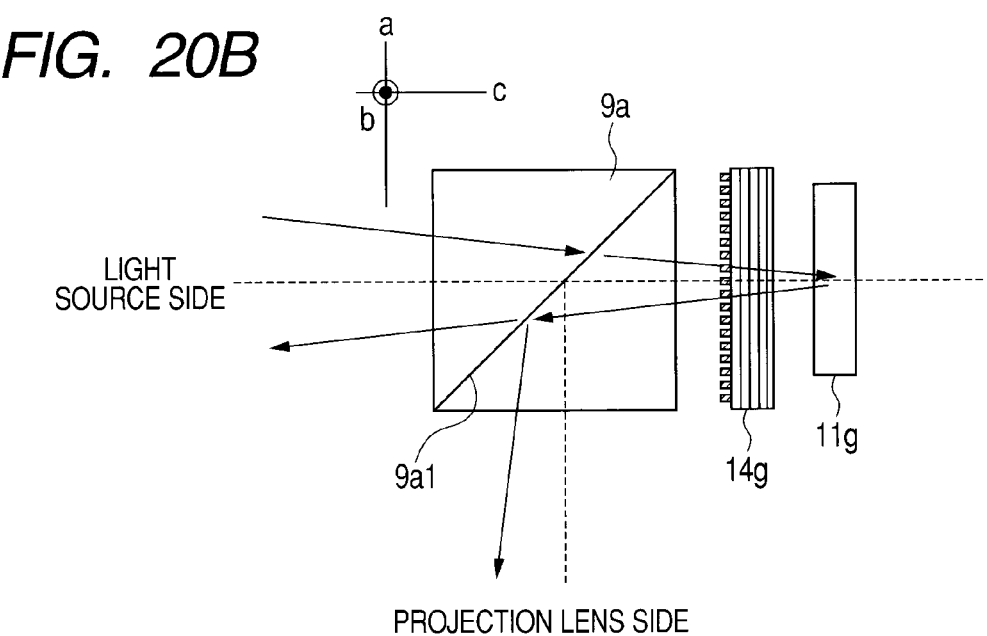

FIG. 20B illustrates the device arrangement at a vicinity of the liquid crystal display device in the green color (G) optical path in the optical system of FIG. 20A. In the structure, the phase plate 14g of the present invention is disposed between the liquid crystal display device 11g and the polarization beam splitter 9a.

Here, the three-dimensional space is expressed by the a-axis, the b-axis, and the c-axis. The surface normal direction of the reflection type liquid crystal display device is represented by the c-axis. The direction that is perpendicular to both the normal direction of the polarization separation surface of the polarization beam splitter and the c-axis is represented by the b-axis. The direction that is perpendicular to both the c-axis and the b-axis is represented by the a-axis.

In this case, it is desirable that the lattice period direction of the one-dimensional lattice structure portion of the phase plate 14g is perpendicular to the c-axis, and is desirably disposed so as to be inclined with respect to the a-axis or the b-axis by a very small angle of approximately 1 degree. The phase plate 14g performs the phase compensation for both the polarization beam splitter 9a and the liquid crystal display device 11g, and the action of the phase compensation is equivalent to the combined action of the ¼ wavelength plate 12g and the laminated thin film 13g illustrated in FIG. 14A, and hence description thereof is omitted. The phase plate 14g is preferred to be disposed so that the one-dimensional lattice portion becomes the polarization beam splitter 9a side and the normal of the surface becomes parallel to the c-axis. In addition, though the phase plate is disposed in each optical path corresponding to each color, the arrangement and the action thereof are the same to each other.

Here, also in this embodiment, similarly to Embodiment 6, it is preferred that the polarization beam splitters 9a and 9b disposed in the liquid crystal projector are the polarization beam splitter utilizing the structural birefringence. In addition, the phase plates 14g, 14b, and 14r may be formed on the protection glass of the liquid crystal display devices 11g, 11b, and 11r or on the surface of the prism constituting the polarization beam splitters 9a and 9b facing the liquid crystal display device.

TABLE 1

| Layer number | Material | Thickness [nm] |
|---|---|---|
| 1 | $SiO_2$ | 122 |
| 2 | $TiO_2$ | 38 |
| 3 | $SiO_2$ | 48 |
| 4~ | $TiO_2$ | 48 } 22 |
| ~25 | $SiO_2$ | 48 |
| 26 | $TiO_2$ | 25 |
| 27 | $SiO_2$ | 22 |
| Substrate | BK7 | |
| Total | | 27 layers |
| Total thickness [nm] | | 1,311 |

TABLE 2

| Layer number | Material | Thickness [nm] |
|---|---|---|
| 1 | $SiO_2$ | 89 |
| 2 | $TiO_2$ | 32 |
| 3 | $SiO_2$ | 29 |
| 4~ | $TiO_2$ | 36 } 22 |
| ~21 | $SiO_2$ | 36 |
| 22 | $TiO_2$ | 19 |
| 23 | $SiO_2$ | 17 |
| Substrate | BK7 | |
| Total | | 35 layers |
| Total thickness [nm] | | 1,266 |

TABLE 3

| Layer number | Material | Thickness [nm] |
|---|---|---|
| 1 | $SiO_2$ | 129 |
| 2 | $TiO_2$ | 68 |
| 3 | $SiO_2$ | 40 |
| 4~ | $TiO_2$ | 60 } 22 |
| ~21 | $SiO_2$ | 60 |
| 22 | $TiO_2$ | 32 |
| 23 | $SiO_2$ | 76 |
| Substrate | BK7 | |
| Total | | 23 layers |
| Total thickness [nm] | | 1,425 |

TABLE 4

| Layer number | Material | Thickness [nm] |
|---|---|---|
| 1 | $SiO_2$ | 99 |
| 2 | $TiO_2$ | 74 |
| 3 | $SiO_2$ | 29 |
| 4 | $TiO_2$ | 45 |
| 5 | $SiO_2$ | 57 |
| 6 | $TiO_2$ | 47 |
| 7 | $SiO_2$ | 59 |
| 8 | $TiO_2$ | 49 |
| 9 | $SiO_2$ | 58 |
| 10 | $TiO_2$ | 42 |
| 11 | $SiO_2$ | 70 |
| 12 | $TiO_2$ | 46 |
| 13 | $SiO_2$ | 58 |
| 14 | $TiO_2$ | 49 |
| 15 | $SiO_2$ | 58 |

TABLE 4-continued

| Layer number | Material | Thickness [nm] |
|---|---|---|
| 16 | $TiO_2$ | 47 |
| 17 | $SiO_2$ | 59 |
| 18 | $TiO_2$ | 46 |
| 19 | $SiO_2$ | 57 |
| 20 | $TiO_2$ | 45 |
| 21 | $SiO_2$ | 53 |
| 22 | $TiO_2$ | 24 |
| 23 | $SiO_2$ | 11 |
| Substrate | BK7 | |
| | Total | 23 layers |
| Total thickness [nm] | | 1,182 |

TABLE 5

| Layer number | Material | Thickness [nm] | |
|---|---|---|---|
| 1 | $SiO_2$ | 118 | |
| 2 | $TiO_2$ | 46 | |
| 3 | $SiO_2$ | 42 | |
| 4~ | $TiO_2$ | 42 | |
| ~ | $Al_2O_3$ | 20 | } 42 |
| ~33 | $SiO_2$ | 42 | |
| 34 | $TiO_2$ | 23 | |
| 35 | $SiO_2$ | 85 | |
| Substrate | BK7 | | |
| | Total | 35 layers | |
| Total thickness [nm] | | 1,354 | |

TABLE 6

| | $d_H$ [nm] | $d_L$ [nm] | Number of laminated layers | Total thickness [nm] |
|---|---|---|---|---|
| Embodiment 1 | 46 | 51 | 27 | 1,311 |
| Embodiment 4 | 47 | 56 | 23 | 1,182 |
| Embodiment 5 | 41 | 51 | 35 | 1,354 |
| Comparison example | 15 | 15 | 112 | 1,798 |

TABLE 7

| One-dimensional lattice structure portion 53 | | |
|---|---|---|
| | Lattice portion 51 | Lattice portion 52 |
| Material | $TiO_2$ | Air |
| Lattice width | 146 | 34 |
| Lattice height | 510 | |

| Laminated thin film 55 | | |
|---|---|---|
| Layer number | Material | Thickness [nm] |
| 1 | One-dimensional lattice | 510 |
| 2 | $TiO_2$ | 146 |
| 3 | $SiO_2$ | 26 |
| 4 | $TiO_2$ | 42 |
| 5 | $SiO_2$ | 45 |
| 6~ | $TiO_2$ | 45 |
| ~37 | $SiO_2$ | 45 |
| 38 | $TiO_2$ | 35 |
| 39 | $SiO_2$ | 57 |
| 40 | $TiO_2$ | 13 |
| Substrate | BK7 | |
| | Total | 40 layers |
| Total thickness [nm] | | 2,257 |

TABLE 8

| One-dimensional lattice structure portion 53 | | |
|---|---|---|
| | Lattice portion 51 | Lattice portion 52 |
| Material | $TiO_2$ | Air |
| Lattice width | 120 | 25 |
| Lattice height | 406 | |

| Laminated thin film 55 | | |
|---|---|---|
| Layer number | Material | Thickness [nm] |
| 1 | One-dimensional lattice | 406 |
| 2 | $TiO_2$ | 110 |
| 3 | $SiO_2$ | 21 |
| 4 | $TiO_2$ | 32 |
| 5 | $SiO_2$ | 33 |
| 6~ | $TiO_2$ | 33 |
| ~43 | $SiO_2$ | 33 |
| 44 | $TiO_2$ | 19 |
| 45 | $SiO_2$ | 19 |
| Substrate | BK7 | |
| | Total | 45 layers |
| Total thickness [nm] | | 1,894 |

TABLE 9

| One-dimensional lattice structure portion 53 | | |
|---|---|---|
| | Lattice portion 51 | Lattice portion 52 |
| Material | $TiO_2$ | Air |
| Lattice width | 182 | 48 |
| Lattice height | 510 | |

| Laminated thin film 55 | | |
|---|---|---|
| Layer number | Material | Thickness [nm] |
| 1 | One-dimensional lattice | 637 |
| 2 | $TiO_2$ | 162 |
| 3 | $SiO_2$ | 44 |
| 4 | $TiO_2$ | 48 |
| 5 | $SiO_2$ | 57 |
| 6~ | $TiO_2$ | 57 |
| ~29 | $SiO_2$ | 57 |
| 30 | $TiO_2$ | 42 |
| 31 | $SiO_2$ | 76 |
| 32 | $TiO_2$ | 14 |
| Substrate | BK7 | |
| | Total | 32 layers |
| Total thickness [nm] | | 2,448 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-018003, filed Jan. 29, 2009, which is hereby incorporated by reference herein in its entirety.

What is claimed is:
1. A laminated thin film, comprising:
a substrate; and
at least two types of materials laminated on the substrate, the laminated thin film has a transmittance of 95% or higher in a working wavelength band with respect to both P-polarized light and S-polarized light, and the following expression (1) is satisfied with respect to a light ray of a specific wavelength $\lambda_0$ contained in the working wavelength band, and the following expressions (2) and (3) are always satisfied in a range of $0<\theta\leq15$ degrees, $$0.25 < (n_H \cdot d_H + n_L \cdot d_L)/\lambda_0 < 0.5 \quad (1)$$

$$0.95 \leq \frac{\Delta(\theta)}{A\sin^2\theta} \leq 1.05 \quad (2)$$

$$\text{where, } A = \frac{\Delta(10°)}{\sin^2(10°)}, |\Delta(10°)| \geq 2.0 \text{(degrees)} \quad (3)$$

where an average film thickness of a material having relatively high refractive index $n_H$ is represented by $d_H$, an average film thickness of a material having relatively low refractive index $n_L$ is represented by $d_L$ of the materials forming the laminated thin film, and a phase difference received by a light ray entering at an angle $\theta$ with respect to a normal of a surface of the laminated thin film is represented by $\Delta(\theta)$.

2. A laminated thin film according to claim 1, wherein a film thickness ratio m expressed by the following equation is 0.43 or larger, $$m = d_H/(d_H + d_L).$$

3. A laminated thin film according to claim 1, wherein the laminated thin film is formed on a flat surface.

4. A laminated thin film according to claim 1, wherein the laminated thin film is made of inorganic materials.

5. A phase plate comprising:
a substrate;
a one-dimensional periodical structure with a period that is a minimum wavelength or smaller in a working wavelength band in an in-plane direction of the substrate; and
a laminated thin film including at least two or more types of materials laminated on one another,
the following expression (1) is satisfied with respect to a light ray of a specific wavelength $\lambda_0$ contained in the working wavelength band, and the following expressions (5) and (6) are always satisfied in a range of $0<\theta\leq15$ degrees;

$$0.25 < (n_H \cdot d_H + n_L \cdot d_L)/\lambda_0 < 0.5 \quad (1)$$

$$0.95 \leq \frac{B - \Delta(\theta)}{A\sin^2\theta} \leq 1.05 \text{ where} \quad (5)$$

$$A = \frac{B - \Delta(10°)}{\sin^2(10°)}, |B - \Delta(10°)| \geq 2.0 \text{(degrees)}, B = \Delta(0°) \quad (6)$$

where an average film thickness of a material having relatively high refractive index $n_H$ is represented by $d_H$, an average film thickness of a material having relatively low refractive index $n_L$, is represented by $d_L$, of the materials forming the laminated thin film, and a phase difference received by a light ray entering at an angle $\theta$ with respect to a normal of a surface of the laminated thin film is represented by $\Delta(\theta)$.

6. A phase plate according to claim 5, wherein the phase plate acts as a ¼ wavelength plate.

7. A phase plate according to claim 5, wherein a film thickness ratio m expressed by the following equation is 0.43 or larger, $$m = d_H/(d_H + d_L).$$

8. A phase plate according to claim 5, wherein the phase plate is formed on a flat surface.

9. A phase plate according to claim 5, wherein the phase plate is made of inorganic materials.

10. A reflective liquid crystal display apparatus, comprising:
a light source;
a polarization beam splitter which transmits P-polarized light and reflects S-polarized light in illumination light emitted from the light source;
a reflection type liquid crystal display device which converts the illumination light into image light and reflects the image light;
a ¼ wavelength plate disposed between the polarization beam splitter and the reflection type liquid crystal display device;
the laminated thin film according to claim 1 disposed between the ¼ wavelength plate and the reflection type liquid crystal display device; and
a projection optical system which projects the image light,
wherein:
the reflection type liquid crystal display device has positive refractive index anisotropy;
when a three-dimensional space is expressed by a c-axis representing a normal direction of a surface of the reflection type liquid crystal display device, a b-axis in a direction that is perpendicular to both a normal direction of a polarization separation surface of the polarization beam splitter and the c-axis, and an a-axis in a direction that is perpendicular to both the c-axis and the b-axis,
an optical axis direction of the reflection type liquid crystal display device in a black display state has a pretilt angle with respect to the c-axis;
both of normal directions of surfaces of the ¼ wavelength plate and the laminated thin film are parallel to the c-axis; and
an optical axis of the ¼ wavelength plate forms an angle of one of 0.5 to 5 degrees and −5 to −0.5 degrees with one of the a-axis and the b-axis.

11. A reflective liquid crystal display apparatus according to claim 10, wherein the polarization separation surface of the polarization beam splitter includes a form biregringence layer formed of a one-dimensional periodical structure with a period that is a minimum wavelength or smaller in a working wavelength band in a direction parallel to the polarization separation surface.

12. A reflective liquid crystal display apparatus, comprising:
a light source;
a polarization beam splitter which transmits P-polarized light and reflects S-polarized light in illumination light emitted from the light source;
a reflection type liquid crystal display device which converts the illumination light into image light and reflects the image light;
the phase plate according to claim 5 disposed between the polarization beam splitter and the reflection type liquid crystal display device; and
a projection optical system which projects the image light,
wherein:
the reflection type liquid crystal display device has positive refractive index anisotropy;
when a three-dimensional space is expressed by a c-axis representing a normal direction of a surface of the reflection type liquid crystal display device, a b-axis in a direction that is perpendicular to both a normal direction of a polarization separation surface of the polarization beam splitter and the c-axis, and an a-axis in a direction that is perpendicular to both the c-axis and the b-axis;

an optical axis direction of the reflection type liquid crystal display device in a black display state has a pretilt angle with respect to the c-axis;
a normal direction of a surface of the phase plate is parallel to the c-axis; and
a periodic direction of the one-dimensional periodical structure of the phase plate forms an angle of one of 0.5 to 5 degrees and −5 to −0.5 degrees with one of the a-axis and the b-axis.

13. A reflective liquid crystal display apparatus according to claim 12, wherein the polarization separation surface of the polarization beam splitter includes a form biregringence layer formed of a one-dimensional periodical structure with a period that is a minimum wavelength or smaller in a working wavelength band in a direction parallel to the polarization separation surface.

* * * * *